United States Patent
Yatake

(10) Patent No.: US 7,569,104 B2
(45) Date of Patent: *Aug. 4, 2009

(54) INK FOR INK-JET RECORDING

(75) Inventor: Masahiro Yatake, Nagano-ken (JP)

(73) Assignee: Eiko Epson Corporation, Tokyo (JP)

( * ) Notice: Subject to any disclaimer, the term of this patent is extended or adjusted under 35 U.S.C. 154(b) by 338 days.

This patent is subject to a terminal disclaimer.

(21) Appl. No.: 11/435,564

(22) Filed: May 17, 2006

(65) Prior Publication Data

US 2006/0266260 A1 Nov. 30, 2006

(30) Foreign Application Priority Data

| May 17, 2005 | (JP) | 2005-143549 |
| Jul. 4, 2005 | (JP) | 2005-194650 |
| Mar. 3, 2006 | (JP) | 2006-057318 |
| Mar. 27, 2006 | (JP) | 2006-084948 |

(51) Int. Cl.
C09D 11/02 (2006.01)

(52) U.S. Cl. .............. 106/31.58; 106/31.59; 106/31.86; 106/31.89

(58) Field of Classification Search ............. 106/31.58, 106/31.86, 31.59, 31.89
See application file for complete search history.

(56) References Cited

U.S. PATENT DOCUMENTS

| 2,083,372 A | | 6/1937 | Guthmann | |
| 5,141,556 A | * | 8/1992 | Matrick | 106/31.58 |
| 5,156,675 A | | 10/1992 | Breton et al. | |
| 5,183,502 A | | 2/1993 | Meichsner et al. | |
| 5,196,056 A | | 3/1993 | Prasad | |
| 5,356,464 A | * | 10/1994 | Hickman et al. | 106/31.86 |
| 5,534,050 A | * | 7/1996 | Gundlach | 106/31.58 |
| 5,772,746 A | * | 6/1998 | Sawada et al. | 106/31.86 |
| 7,052,537 B2 | * | 5/2006 | Uhlir-Tsang | 106/31.58 |
| 7,229,489 B2 | * | 6/2007 | Yatake | 106/31.58 |
| 7,442,244 B2 | * | 10/2008 | Ishihara | 106/31.58 |
| 2005/0235870 A1 | * | 10/2005 | Ishihara | 106/31.58 |
| 2007/0117882 A1 | * | 5/2007 | Aoyama et al. | 523/160 |
| 2007/0159516 A1 | * | 7/2007 | Sato et al. | 106/31.58 |
| 2007/0247496 A1 | * | 10/2007 | Sekiguchi | 347/84 |
| 2008/0213548 A1 | * | 9/2008 | Koganehira et al. | 106/31.6 |

FOREIGN PATENT DOCUMENTS

| JP | 56-147861 | 11/1981 |
| JP | 06-157955 | 6/1994 |
| JP | 07-305009 | 11/1995 |
| JP | 08-333541 | 12/1996 |
| JP | 09-003371 | 1/1997 |
| JP | 09-111165 | 4/1997 |
| JP | 11-061024 | 3/1999 |
| JP | 2000-072864 | 3/2000 |

OTHER PUBLICATIONS

Patent Abstracts of Japan of JP 56-147861 Dated Nov. 17, 1981.
Patent Abstracts of Japan and JPO Computer English Translation of JP 09-111165 Dated Apr. 28, 1997.
Patent Abstracts of Japan and JPO Computer English Translation of JP 09-003371 Dated Jan. 7, 1997.
Patent Abstracts of Japan and JPO Computer English Translation of JP 06-157955 Dated Jun. 7, 1994.
Patent Abstracts of Japan and JPO Computer English Translation of JP 07-305009 Dated Nov. 21, 1995.
Patent Abstracts of Japan and JPO Computer English Translation of JP 08-333541 Dated Dec. 17, 1996.
Patent Abstracts of Japan and JPO Computer English Translation of JP 11-061024 Dated Mar. 5, 1999.
Patent Abstracts of Japan and JPO Computer English Translation of JP 2000-072864 Dated Mar. 7, 2000.

* cited by examiner

*Primary Examiner*—Helene Klemanski
(74) *Attorney, Agent, or Firm*—Ladas and Parry LLP

(57) ABSTRACT

The present invention provides an ink jet recording ink which has excellent stability, high coloration on regular paper, high glossiness on gloss paper and excellent discharge stability of an ink from an ink jet head. This ink jet recording ink uses 2-methyl-2-propyl-1,3-propanediol. The added amount of 2-methyl-2-propyl-1,3-propanediol is no less than 0.1% by weight and no more than 2.0% by weight.

8 Claims, No Drawings

INK FOR INK-JET RECORDING

BACKGROUND OF THE INVENTION

1. Field of the Invention

The present invention relates to an ink jet recording ink.

2. Description of the Related Art

Ink-jet recording is a process in which an ink is ejected as small droplets from a minute nozzle to record characters or images on a surface of a recording medium. Techniques of ink-jet recording which have been put into practical use include: a method composed of converting electrical signals to mechanical signals with an electrostrictive element and intermittently ejecting an ink stored in a nozzle head to record characters or images on a surface of a recording medium; and a method composed of bubbling an ink stored in a nozzle head by rapidly heating that part of the ink which is located very close to the orifice and intermittently ejecting the ink based on the volume expansion caused by the bubbling to thereby record characters or images on a surface of a recording medium.

There have been required characteristics such as no blurring in printing to paper as the recording medium, good drying characteristic, uniform printability to the surfaces of various recording medium, and no mixture of adjacent colors in multicolor system printing such as color printing in such ink used for ink-jet recording.

In the conventional ink, particularly in a variety of kinds of ink using a pigment, the wettability of the ink to the surface of the paper is suppressed by mainly suppressing the permeability, and the securement of print quality is examined by confining ink drops near the surface of the paper. The ink has been put into practical use. However, in the ink which suppresses the wettability to the paper, the difference in blurring due to difference in paper types is large. Particularly, the blurring caused by the difference in wettability characteristics of the ink to each of the components occurs in recycled paper in which various components of paper are mixed. A problem exists in that it takes a long time to dry the printing in such ink and adjacent colors are mixed in multicolor system printing such as color printing. A problem also exists in that rubbing resistance is worsened since the pigment remains on the surface of the paper or the like in the ink using the pigment as a color material.

In order to solve the problems, the enhancement of the permeability of the paper to the paper has been attempted, and there have been examined the addition of diethylene glycol monobutyl ether (U.S. Pat. No. 5,156,675, specification), the addition of Surfynol 465 (manufactured by Nissin Chemical Industry Corporation) as an acetylene glycol system surfactant (U.S. Pat. No. 5,183,502, specification), or the addition of both the diethylene glycol monobutyl ether and the Surfynol 465(U.S. Pat. No. 5,196,056, specification). Or the use of ethers of diethylene glycol for ink has been examined (U.S. Pat. No. 2,083,372, specification).

It is generally difficult to enhance the permeability of an ink while securing the dispersion stability of a pigment in the ink using the pigment, and the range of selection of a penetrating agent becomes narrow. Some combinations of glycol ether and pigment include an example in which triethylene glycol monomethyl ether is used for the pigment (Japanese Published Unexamined Patent Application No. S56-147861), and an example using ethers of ethylene glycol, diethylene glycol or triethylene glycol for the pigment (Japanese Published Unexamined Patent Application No. H9-111165).

Examples of penetrating agents used for ink composition for thermal ink jet printing include 1,2-hexanediol, 1,2-octanediol, 2-methyl-2-propyl-1,3-propanediol (Japanese Published Unexamined Patent Application No. H9-3371).

SUMMARY OF THE INVENTION

However, the printing quality of the conventional aqueous ink was inadequate. In addition, a large amount of blurring was generated and color density and coloration property of the ink were not inadequate when the printing was carried out on regular paper such as PPC paper. A problem existed in that since the conventional pigment dispersion was unstable, and the absorption and desorption of a resin dispersing the pigment to the pigment easily occurs when a substance having a hydrophilic part and a hydrophobic part such as a surfactant and glycol ether, existed, and the preservation stability of the ink was inferior. Furthermore, in order to reduce the blurring to the paper, substances having the hydrophilic part and the hydrophobic part such as the surfactant and the glycol ether are required for typical aqueous ink. A problem existed in that the permeability to the paper became inadequate in the ink which did not use these substances, and the paper types were limited in order to perform uniform printing to easily cause the reduction of printing images.

Furthermore, the following problem existed. That is, when additives (an acetylene glycol and acetylene alcohol surfactant, di(tri)ethylene glycol monobutyl ether, (di)propylene glycol monobutyl ether, or 1,2-alkylene glycol or the mixture thereof) used in the present invention were used for the conventional pigment dispersion, a long-term preservation stability was not obtained. Also, since the redissolvability of the ink was poor, the ink was dried and clogged easily at the tip or the like of a nozzle of an ink jet head (clogging).

The present invention solves the aforementioned problems. It is an object of the present invention to provide an ink jet recording ink which has high coloration on regular paper and high glossiness on gloss paper. It is another object of the present invention to provide an ink jet recording ink which obtains an excellent printing image on regular paper and gloss paper, has excellent stability, and suppresses or avoids clogging to have excellent discharge stability.

The present invention is directed to an ink for ink-jet recording, containing one or at least two kinds selected from the following 1,3-propanediol derivatives: (a) 2-methyl-2-propyl-1,3-propanediol; (b) 2,2-dibutyl-1,3-propanediol; (c) 2-butyl-2-methy-1,3-propanediol; (d) an ethylene oxide adduct of 2,2-dibutyl-1,3-propanediol; (e) a propylene oxide adduct of 2,2-dibutyl-1,3-propanediol; and/or (f) an ethylene oxide and propylene oxide adduct of 2,2-dibutyl-1,3-propanediol.

In the ink of the present invention, the amount of 2-methyl-2-propyl-1,3-propanediol contained is preferably 0.1% by weight to 2.0% by weight, and the amount of 2,2-dibutyl-1, 3-propanediol contained is preferably 0.1% by weight to 1.5% by weight. And the amount of one or at least two kinds of adducts selected from the (d) to (f) is preferably 0.1% by weight to 5.0% by weight, and the amount of 2-butyl-2-methyl-1,3-propanediol is preferably 0.1% by weight to 5.0% by weight.

It is preferable that the ink for ink-jet recording of the present invention contains 1,2-alkylene glycol and an acetylene glycol surfactant and/or an acetylene alcohol surfactant. It is preferable that the ink for ink-jet recording of the present invention contains at least water, a coloring material, and humectant. Also, it is preferable that the ink contains a pigment as a coloring material, and the glass transition temperature of a polymer used for the dispersion of the pigment is 50° C. or less.

DESCRIPTION OF THE PREFERRED EMBODIMENTS

The ink jet recording ink of the present invention contains the above specific 1,3-propanediol derivative, and thereby regular paper and specialized paper can obtain excellent permeability to provide excellent printing characteristics. These characteristics can be maintained and enhanced without hindering the stability and discharge stability of ink by the addition of 1,3-propanediol derivative. As a result, the present invention can provide an ink jet recording ink which has printing characteristics having high coloration on regular paper and high glossiness on specialized paper such as gloss paper, and has excellent stability, and excellent discharge stability and clogging stability of ink from an ink jet head in addition to these printing characteristics. Hereinafter, embodiments of the present invention will be described in detail.

(1,3-Propanediol Derivative)

The ink of the present invention can contain one or at least two kinds selected from 2-methyl-2-propyl-1,3-propanediol, 2,2-dibutyl-1,3-propanediol, 2-butyl-2-methy-1,3-propanediol, an ethylene oxide adduct of 2,2-dibutyl-1,3-propanediol, a propylene oxide adduct of 2,2-dibutyl-1,3-propanediol, and an ethylene oxide and propylene oxide adduct of 2,2-dibutyl-1,3-propanediol. That is, these various kinds of 1,3-propanediol derivatives can be used singly or in combination of two kinds or more.

The added amount of 2-methyl-2-propyl-1,3-propanediol is preferably no less than 0.1% by weight and no more than 2.0% by weight. The added amount of less than 0.1% by weight reduces the coloration property of regular paper and the glossiness of gloss paper. Also, the added amount exceeding 2.0% by weight worsens the discharge stability. The added amount of 2,2-dibutyl-1,3-propanediol is preferably no less than 0.1% by weight and no more than 2.0% by weight. The added amount of less than 0.1% by weight reduces the coloration property of regular paper and the glossiness of gloss paper. Also, the added amount exceeding 1.5% by weight worsens the discharge stability. The added amount of 2-butyl-2-methyl-1,3-propanediol is preferably no less than 0.1% by weight and no more than 5.0% by weight. The added amount of less than 0.1% by weight reduces the coloration property of regular paper and the glossiness of gloss paper. Also, the added amount exceeding 5.0% by weight worsens the discharge stability.

It is preferable that the added amount of ethylene oxide (EO) adduct and/or propylene oxide (PO) adduct of 2,2-dibutyl-1,3-propanediol is no less than 0.1% by weight and no more than 5.0% by weight. The added amount of less than 0.1% by weight reduces the coloration property of regular paper and the glossiness of gloss paper. Also, the added amount exceeding 5.0% by weight worsens the discharge stability. It is preferable that the added amount of EO of the EO adduct is no less than 1 and no more than 10 per molecule of 2,2-dibutyl-1,3-propanediol, and/or the added amount of PO of the PO adduct is no less than 1 and no more than 5 per molecule of 2,2-dibutyl-1,3-propanediol. The added amount of the EO or PO of the above range enhances the discharge stability of the ink from the ink jet nozzle and also enhances the glossiness on specialized paper. Both the EO and the PO may be added in 2,2-dibutyl-1,3-propanediol of one molecule.

Although the added amount of each of the above various kinds of 1,3-propanediol derivatives is preferably applied when the 1,3-propanediol derivative is singly used, the lower limit of the above added amount can be applied as the amount of lower limit of each of the derivatives when combining two or more kinds of various kinds of 1,3-propanediol derivatives.

(Coloring Material)

As a coloring material, a dye, a pigment or the combination thereof can be used. As the dye, a general dye capable of being used for ink jets can be used. Examples thereof include colorants classified into an oil soluble dye and a basic dye or the like in addition to ones classified into an acid dye, a direct color, a reactive dye, a vat dye, a sulfide dye or a pigment for food in color index. As the pigment, examples of pigments for black ink include carbon blacks (C.I. Pigment black 7), such as furnace black, lamp black, acetylene black and channel black; metals such as copper oxides, iron oxides (C.I. Pigment black 11) and titanium oxide; and organic pigments such as aniline black (C.I. Pigment black 1). The carbon black which is comparatively low in specific density and does not settle readily in water is preferable for ink jets.

Furthermore, as pigments for color inks, there can be used C.I. Pigment Yellow 1 (Fast Yellow G), 3, 1,2 (Dis-Azo Yellow AAA), 13, 14, 17, 24, 34, 35, 37, 42 (Yellow Iron Oxide), 53, 55, 74, 81, 83 (Dis-Azo Yellow HR), 93, 94, 95, 97, 98, 100, 101, 104, 108, 109, 110, 117, 1,20, 1,28, 1,29, 138, 153, 180, C.I. Pigment Red 1, 2, 3, 5, 17, 22 (Brilliant Fast Scarlet), 23, 31, 38, 48:2 (Permanent Red 2B (Ba)), 48:2 (Permanent Red 2B (Ca)), 48:3 (Permanent Red 2B (Sr)), 48:4 (Permanent Red 2B (Mn)), 49:1, 52:2, 53:1, 57:1 (Brilliant Carmine 6B), 60:1, 63:1, 63:2, 64:1, 81 (Rhodamine 6G Lake), 83, 88, 101 (Red Iron Oxide), 104, 105, 106, 108 (Cadmium red), 11, 2, 114, 1,22 (Quinacridone Magenta), 1,23, 146, 149, 166, 168, 170, 172, 177, 178, 179, 185, 190, 193, 202, 206, 209, 219, C.I. Pigment Violet 19, 23, C.I. Pigment Orange 36, C.I. Pigment Blue 1, 2, 15 (Phthalocyanine Blue R), 15:1, 15:2, 15:3 (Phthalocyanine Blue G), 15:4, 15:6 (Phthalocyanine Blue E), 16, 17:1, 56, 60, 63, C.I. Pigment Green 1, 4, 7, 8, 10, 17, 18, and 36 or the like.

Thus, although it is preferable to use various dyes and pigments as the coloring material, it is preferable to use the coloring material in an aspect where the coloring material is coexistent with a polymer, such as an aspect where the coloring material is dispersed by using a polymer, an aspect where the coloring material such as the pigment is coated with the polymer, an aspect where a dye is penetrated in the polymer, and an aspect where polymer fine particles are used with the coloring material such as the pigment and a dispersion polymer.

When the pigment is used as the coloring material, the glass transition temperature of the polymer used for the dispersion of the pigment is preferably 50° C. or less. It is because the glass transition temperature exceeding 50° C. tends to reduce the fixing property on regular paper and gloss paper, and the temperature exceeding 50° C. reduces the coloration property on regular paper, and reduces the glossiness on gloss paper. When the glass transition temperature of the polymer is set to 50° C. or less, and any selected from 2-methyl-2-propyl-1,3-propanediol, 2,2-dibutyl-1,3-propanediol, 2-butyl-2-methyl-1,3-propanediol, and an ethylene oxide adduct and propylene oxide adduct of 2,2-dibutyl-1,3-propanediol which are preferably used in the ink of the present invention to be described below is used, the glass transition temperature is more apparently reduced. The overlap portions of dots on gloss paper are easily fused, and the surface leveling property of the dots is enhanced, thereby enhancing the glossiness. The glass transition temperature is more preferably no less than 20° C. and no more than 45° C.

The pigment, which is the coloring material, is dispersed by using a dispersing machine. Although a variety of commercially available dispersing machines can be used as the dispersing machine, a non-media dispersion is preferable. Specific examples thereof include a wet jet mill (SINUS COMPANY), Nanomizer (NANOMIZER COMPANY), Homogenizer (GAULIN COMPANY), Ultimaizer (SUGINO MACHINE COMPANY) and Microfluidizer (MICROFLUIDICS COMPANY).

The added amount of the coloring material is preferably no less than 0.5% by weight and no more than 30% by weight, and more preferably no less than 1.0% by weight and no more than 15% by weight. The amount of less than 0.5% by weight cannot secure printing density, and the amount exceeding 30% by weight causes an increase in viscosity of the ink and structural viscosity in viscosity characteristics, and thereby the discharge stability of the ink from the ink jet head tends to be reduced.

(Surfactant and Glycol Ethers)

It is preferable that the surface tension of the ink of the present invention is set to no less than 20 mN/m and no more than 40 mN/m in view of a reduction in blurring on regular paper and the enhancement of quick-drying of gloss paper, and the optimization of the diameter of dots printed by ink jet on specialized paper or the like. The surface tension range is particularly preferable when using the pigment as the coloring material. Therefore, surfactants such as an acetylene alcohol surfactant, an acetylene glycol surfactant and a silicone surfactant can be used. The surfactant is preferably selected from the acetylene alcohol surfactant and the acetylene glycol surfactant.

It is preferable that the added amount of the above acetylene glycol surfactant and/or acetylene alcohol surfactant is no less than 0.1% by weight and no more than 5.0% by weight in order to reduce blurring on regular paper and optimize the size of the dots on specialized paper. The effect of a reduction in blurring on regular paper is low, when the amount is less than 0.1% by weight. The size of the dots on specialized paper is easily varied and the discharge stability of ink is also reduced when the amount exceeds 5% by weight. The amount is more preferably no less than 0.2% by weight and no more than 1.5% by weight.

Also, in order to set the surface tension of the ink of the present invention to no less than 20 mN/m and no more than 40 mN/m, it is preferable to add alkylene glycol monoalkyl ether and/or 1,2-alkylene glycol with the above surfactant, or singly. It is preferable that the alkylene glycol monoalkyl ether is an alkylene glycol having a repeating unit of 10 or less and an alkyl ether having 4 to 10 carbon atoms. It is preferable that the alkylene glycol monoalkyl ether is di(tri)ethylene glycol monobutyl ether and/or (di)propylene glycol monobutyl ether. These ethers are particularly preferable when the pigment is used as the coloring material. It is preferred that 1,2-alkylene glycol is 1,2-hexanediol and/or 1,2-pentanediol. The drying property of the print is enhanced by the addition, and since even when continuous printing is performed, a previously printed part will not become transferred onto the rear surface of a subsequent medium, high-speed printing is enabled.

It is more preferable that the ink of the present invention contains the above acetylene glycol surfactant and/or acetylene alcohol surfactant, and one kind or more selected from di(tri)ethylene glycol monobutyl ether, (di)propylene glycol monobutyl ether, and 1,2-alkylene glycol. It is preferable that the added amount of the above acetylene glycol surfactant and/or acetylene alcohol surfactant is no less than 0.01% by weight and no more than 0.5% by weight, and the added amount of one kind or more selected from di(tri) ethylene glycol monobutyl ether, (di)propylene glycol monobutyl ether, and 1,2-alkylene glycol is preferably 1% by weight or more in view of the reduction in blurring on regular paper and the enhancement of quick-drying on gloss paper.

(Other Components)

The ink of the present invention can contain at least water in addition to the coloring material. Furthermore, to the ink of the present invention, there can be added various types of additives, such as a humectant, a dissolution aid, a penetration controlling agent, a viscosity modifier, a pH adjuster, an antioxidant, a preservative, an antifungal agent, a corrosion inhibitor, a chelate or the like for capturing metal ions which affect dispersion for the purpose of securing shelf stability, stable discharge from an ink jet head, improvement in regard to clogging, or prevention of ink degradation. It is preferable that the ink of the present invention contains at least the humectant of the various additives.

EXAMPLES

Hereinafter, specific embodiments of the present invention will be described. Though examples using a pigment dispersed by using the most preferable polymer are shown as Examples, dyes can also be similarly used. Also, the present invention is not limited to just these Examples.

Example I

Examples 1 to 6 of Example I relate to the preparation and evaluation of ink jet recording inks using 2-methyl-2-propyl-1,3-propanediol (MPPD).

Example 1

(1) Manufacturing of Pigment Dispersion 1

Pigment dispersion 1 (hereinafter, merely referred to as "dispersion 1") used Monarch 880 manufactured by U.S. Cabot Corporation as carbon black (Pigment Black 7: PBk7). After performing nitrogen replacement of the interior of a reaction vessel, equipped with a stirrer, a thermometer, a ref lux tube, and a dripping funnel, 65 parts of paracumylphenoxyethylene glycol acrylate, 10 parts of benzyl acrylate, 2 parts of acrylic acid, and 0.3 parts of t-dodecyl mercaptan were placed in the reaction vessel and heated to 70° C. Then, 150 parts of paracumylphenoxyethylene glycol acrylate, 15 parts of acrylic acid, 5 parts of butyl acrylate, 1 part of t-dodecyl mercaptan, 20 parts of methyl ethyl ketone and 1 part of sodium persulfate, which were prepared separately, were placed in the dripping funnel and dripped into the reaction vessel over a period of 4 hours to carry out a polymerization reaction of a dispersion polymer. Methyl ethyl ketone was then added to the reaction vessel to prepare a dispersion polymer solution of a concentration of 40%. After taking and drying a part of this polymer, the glass transition temperature was measured by using a differential scanning calorimeter (EXSTAR 6000DSC, manufactured by SEIKO ELECTRON), and was 40° C.

There were mixed 40 parts of the above dispersed polymer solution, 30 parts of Monarch 880 powder (manufactured by Cabot Corporation) as the carbon black, 100 parts of a sodium hydroxide solution of 0.1 mol/L and 30 parts of methyl ethyl ketone. The mixture was then dispersed for 15 passes at 200 MPa using a ultrahigh-pressure homogenizer (Ultimaizer HJP-25005, manufactured by Sugino Machine Limited).

Thereafter, the dispersed mixture was moved to another container, and 300 parts of ion-exchanged water were added and stirring was carried out for another hour. The entire amount of methyl ethyl ketone and a part of the water were then distilled off using a rotary evaporator, and the pH was adjusted to 9 by neutralization by a 0.1 mol/L sodium hydroxide solution. Then filtration through a membrane filter of 0.3 μm was carried out, and a dispersion 1 having a pigment concentration of 20% was prepared by the adjustment with the ion exchanged water.

(2) Manufacturing of Dispersion 2

A dispersion 2 was first prepared as in the dispersion 1 by using pigment blue 15:1 (trichloro copper phthalocyanine pigment: G500, manufactured by Sanyo Color Works, Ltd.).

(3) Manufacturing of Dispersion 3

A dispersion 3 was first prepared as in the dispersion 1 by using pigment violet 19 (quinacridone pigment: manufactured by Clariant).

(4) Manufacturing of Dispersion 4

A dispersion 3 was first prepared as in the dispersion 1 by using pigment yellow 74 (condensed azo pigment: manufactured by Clariant).

(5) Preparation of Ink Jet Recording Ink

Favorable examples of compositions as ink jet recording ink are shown in Table 2. The ink jet recording ink of Example 1 was prepared by mixing the dispersions 1 to 4 prepared by the above method with vehicle components shown in Table 2. 0.05% of Topside 240 (manufactured by Permachem Asia Ltd.) in ion-exchanged water for prevention of corrosion of ink, 0.02% of benzotriazole in ion-exchanged water for prevention of corrosion of ink-jet head parts, and 0.04% of EDTA (ethylenediamine tetraacetic acid)·2Na salt in ion-exchanged water for reducing the effects of metal ions in the ink system were used in the residual quantity of water in Table 1. Comparative examples 1 to 4 were simultaneously prepared in the same manner as Example 1 except being based on Tables 3 to 6.

(6) Evaluation of Dispersion Stability

The percentage change in viscosity (%) and sedimentation (%) upon leaving the prepared ink jet pigment inks at 60° C. for 30 days are shown in Table 1. The dispersion stability is indicated as the percentage change in viscosity (%) upon leaving each ink at 60° C. for 30 days. For the percentage change in viscosity, viscosity values were measured at an angle of 60° C. using the AMVn, manufactured by Anton Paar GmbH (German), and 1−(value after 30 days)/(initial value) is indicated in the form of percentage (%).

(7) Evaluation 1 of Regular Paper OD and Glossiness of Gloss Paper

As regular paper, Xerox 4024 paper manufactured by U.S. Xerox was used, and as gloss paper, PM photograph paper manufactured by Seiko Epson Corporation was used. The ink-jet printer EM930C, manufactured by Seiko Epson Corporation, was used as the printer and evaluations were made using samples printed at 720 dpi photo quality in the case of regular paper and samples printed at 1440 dpi photo quality in the case of gloss paper. The OD was measured using GRETAG MACBETH SPECTROSCAN SPM-50 manufactured by GRETAG COMPANY. It can be evaluated that OD of 1.2 or more is good. Referring to the measurement of the glossiness, the specular glossiness of a recorded surface was measured for an incidence angle of 60 degrees using a gloss checker (IG-320, manufactured by Horiba, Ltd.) and the average of five measurements was determined for each recording paper. It can be evaluated that the glossiness of 60 or more is good. The results are shown in Table 1.

(8) Measurement 1 of Discharge Stability

Printing on 100 pages of A4-size Xerox P paper manufactured by Fuji Xerox at 4000 letters/page of standard of character size of 11 and MSP Gothic of Microsoft Word was carried out at 35° C. in 35% atmosphere by using the ink-jet printer PX-V600, manufactured by Seiko Epson Corporation, and evaluated. The results are shown in Table 1. AA indicates that no print distortions occurred, A indicates that one print distortion occurred, B indicates that print distortions occurred at 2 to 3 locations, C indicates that print distortions occurred at 4 to 5 locations, and D indicates that print distortions occurred at no less than 6 locations.

TABLE 1

The result of Dispersion stability, Regular paper OD, Glossiness of gloss paper and Discharge stability in Example 1, Comparative Example 1-4

|  | Ink | Dispersion | Dispersion stability | Regular paper OD | Glossiness of gloss paper | Discharge stability |
|---|---|---|---|---|---|---|
| Example 1 | 1 | 1 | 1.0 | 1.40 | 71 | A |
|  | 2 | 2 | 1.0 | 1.25 | 94 | AA |
|  | 3 | 3 | 1.0 | 1.20 | 89 | AA |
|  | 4 | 4 | 1.0 | 1.25 | 83 | AA |
| Comparative Example 1 | 5 | 1 | 1.0 | 1.37 | 69 | A |
|  | 6 | 2 | 1.0 | 1.14 | 83 | AA |
|  | 7 | 3 | 1.0 | 1.19 | 82 | AA |
|  | 8 | 4 | 1.0 | 1.20 | 74 | AA |
| Comparative Example 2 | 9 | 1 | 1.0 | 1.36 | 60 | A |
|  | 10 | 2 | 1.0 | 1.13 | 81 | A |
|  | 11 | 3 | 1.1 | 1.18 | 76 | A |
|  | 12 | 4 | 1.1 | 1.20 | 70 | A |
| Comparative Example 3 | 13 | 1 | 1.7 | 1.20 | 55 | C |
|  | 14 | 2 | 1.6 | 1.09 | 72 | B |
|  | 15 | 3 | 1.6 | 1.08 | 69 | C |
|  | 16 | 4 | 1.4 | 1.10 | 63 | B |
| Comparative Example 4 | 17 | 1 | 12.9 | 1.10 | 31 | D |
|  | 18 | 2 | 14.8 | 1.01 | 40 | D |
|  | 19 | 3 | 16.0 | 1.00 | 42 | D |
|  | 20 | 4 | 11.3 | 1.00 | 41 | D |

TABLE 2

Ink compositions of Example 1 (by weight %)

|  | Pigment | | | |
|---|---|---|---|---|
|  | PBk7 | PB15:1 | PV19 | PY74 |
| Dispersion 1 | 35 | — | — | — |
| Dispersion 2 | — | 25 | — | — |
| Dispersion 3 | — | — | 30 | — |
| Dispersion 4 | — | — | — | 30 |
| TEGmBE | 2 | 1 | 1 | 1 |
| 1,2-HD | 3 | 4 | 4 | 4 |
| Glycerin | 10 | 15 | 10 | 10 |
| TMP | 4 | 7 | 5 | 5 |
| MPPD | 0.5 | 0.7 | 0.9 | 1.1 |
| S-104 | 0.15 | 0.15 | 0.15 | 0.15 |
| ion-exchanged water | residual amount | residual amount | residual amount | residual amount |

TEGmBE triethylene glycol monobutyl ether
1,2-HD 1,2-hexanediol
TMP trimethylolpropane
MPPD 2-methy-2-propyl-1,3-propanediol
S-104 Surfynol 104
PBk7 C.I. Pigment Black7
PB15:1 C.I. Pigment Blue15:1
PV19 C.I. Pigment Violet19
PY74 C.I. Pigment Yellow74
Surfynol 104 acetylene glycol surfactant manufactured by Nissin Chemical Industry Corporation

TABLE 3

Ink compositions of Comparative Example 1 (by weight %)

| | Pigment | | | |
|---|---|---|---|---|
| | PBk7 | PB15:1 | PV19 | PY74 |
| Dispersion 1 | 35 | — | — | — |
| Dispersion 2 | — | 25 | — | — |
| Dispersion 3 | — | — | 30 | — |
| Dispersion 4 | — | — | — | 30 |
| TEGmBE | 2 | 1 | 1 | 1 |
| 1,2-HD | 3 | 4 | 4 | 4 |
| Glycerin | 11 | 16 | 11 | 11 |
| TMP | 4 | 7 | 5 | 5 |
| MPPD | — | — | — | — |
| S-104 | 0.15 | 0.15 | 0.15 | 0.15 |
| ion-exchanged water | residual amount | residual amount | residual amount | residual amount |

TABLE 4

Ink compositions of Comparative Example 2 (by weight %)

| | Pigment | | | |
|---|---|---|---|---|
| | PBk7 | PB15:1 | PV19 | PY74 |
| Dispersion 1 | 35 | — | — | — |
| Dispersion 2 | — | 25 | — | — |
| Dispersion 3 | — | — | 30 | — |
| Dispersion 4 | — | — | — | 30 |
| TEGmBE | 2 | 1 | 1 | 1 |
| 1,2-HD | — | — | — | — |
| Glycerin | 14 | 20 | 15 | 15 |
| TMP | 4 | 7 | 5 | 5 |
| MPPD | — | — | — | — |
| S-104 | 0.15 | 0.15 | 0.15 | 0.15 |
| ion-exchanged water | residual amount | residual amount | residual amount | residual amount |

TABLE 5

Ink compositions of Comparative Example 3 (by weight %)

| | Pigment | | | |
|---|---|---|---|---|
| | PBk7 | PB15:1 | PV19 | PY74 |
| Dispersion 1 | 35 | — | — | — |
| Dispersion 2 | — | 25 | — | — |
| Dispersion 3 | — | — | 30 | — |
| Dispersion 4 | — | — | — | 30 |
| TEGmBE | 2 | 1 | 1 | 1 |
| 1,2-HD | — | — | — | — |
| Glycerin | 14 | 19 | 15 | 16 |
| TMP | 4 | 7 | 5 | 5 |
| MPPD | — | — | — | — |
| S-104 | — | — | — | — |
| ion-exchanged water | residual amount | residual amount | residual amount | residual amount |

TABLE 6

Ink compositions of Comparative Example 4 (by weight %)

| | Pigment | | | |
|---|---|---|---|---|
| | PBk7 | PB15:1 | PV19 | PY74 |
| Dispersion 1 | 35 | — | — | — |
| Dispersion 2 | — | 25 | — | — |
| Dispersion 3 | — | — | 30 | — |
| Dispersion 4 | — | — | — | 30 |
| TEGmBE | — | — | — | — |
| 1,2-HD | — | — | — | — |
| Glycerin | 15 | 20 | 15 | 15 |
| TMP | 4 | 7 | 5 | 5 |
| MPPD | — | — | — | — |
| S-104 | 0.01 | 0.01 | 0.01 | 0.01 |
| ion-exchanged water | residual amount | residual amount | residual amount | residual amount |

Example 2

(1) Manufacturing of dispersion 5

Dispersion 5 used MA100 manufactured by Mitsubishi Chemical Industry Corporation as carbon black (PBk7). After performing nitrogen replacement of the interior of a reaction vessel, equipped with a stirrer, a thermometer, a reflux tube, and a dripping funnel, 45 parts of styrene, 30 parts of polyethylene glycol 400 acrylate, 10 parts of benzyl acrylate, 2 parts of acrylic acid, and 0.3 parts of t-dodecyl mercaptan were placed in the reaction vessel and heated to 70° C. Then 150 parts of styrene, 100 parts of polyethylene glycol 400 acrylate, 15 parts of acrylic acid, 5 parts of butyl acrylate, 1 part of t-dodecyl mercaptan, and 5 parts of sodium persulfate, which were prepared separately, were placed in the dripping funnel and dripped into the reaction vessel over a period of 4 hours to carry out a polymerization reaction of a dispersion polymer. Water was then added to the reaction vessel to prepare a dispersion polymer solution of a concentration of 40%. After taking and drying a part of this polymer, the glass transition temperature was measured by using a differential scanning calorimeter (EXSTAR 6000DSC, manufactured by SEIKO ELECTRON), and was 45° C.

There were mixed 40 parts of the above dispersion polymer solution, 30 parts of MA100 which is carbon black, and 100 parts of a sodium hydroxide solution of 0.1 mol/L, and the mixture is dispersed for 2 hours by using an Eiger Mill using zirconia beads. Thereafter, the dispersed mixture was moved to another container, and 300 parts of ion-exchanged water were added and stirring was carried out for another hour. The pH was adjusted to 9 by neutralization by a 0.1 mol/L sodium hydroxide solution. Then, filtration through a membrane filter of 0.3 μm was carried out, thereby preparing dispersion 5, having a solids content (dispersion polymer and carbon black) of 20%.

(2) Manufacturing of Dispersion 6

A dispersion 6 was first prepared as in the dispersion 5 by using pigment blue 15:4 (copper phthalocyanine pigment: manufactured by Clariant).

(3) Manufacturing of Dispersion 7

A dispersion 7 was first prepared as in the dispersion 5 by using pigment red 122 (dimethyl quinacridone pigment: manufactured by Clariant).

(4) Manufacturing of Dispersion 8

A dispersion 8 was first prepared as in the dispersion 5 by using pigment yellow 180 (diketopyrolopyrrole pigment: manufactured by Clariant).

(5) Preparation of Ink Jet Recording Ink

Favorable examples of compositions as ink jet recording ink are shown in Table 8. Ink jet recording inks of Example 2 were prepared in the same manner as Example 1 except being based on the compositions described in Table 8. Ink jet recording inks of Comparative Examples 5 to 8 were simultaneously prepared in the same manner as Example 1 except being based on Tables 9 to 12.

(6) Evaluation

The dispersion stability, OD on regular paper, glossiness on glossy paper and discharge stability of the prepared ink jet recording inks were evaluated by operating in the same manner as Example 1. The results are shown in Table 7.

TABLE 7

The result of Dispersion stability, Regular paper OD, Glossiness of gloss paper and Discharge stability in Example 2, Comparative Example 5-8

|  | Ink | Dispersion | Dispersion stability | Regular paper OD | Glossiness of gloss paper | Discharge stability |
|---|---|---|---|---|---|---|
| Example 2 | 9 | 5 | 1.0 | 1.40 | 71 | A |
|  | 10 | 6 | 1.0 | 1.25 | 94 | AA |
|  | 11 | 7 | 1.0 | 1.20 | 89 | AA |
|  | 12 | 8 | 1.0 | 1.25 | 83 | AA |
| Comparative Example 5 | 13 | 5 | 1.0 | 1.37 | 69 | A |
|  | 14 | 6 | 1.0 | 1.14 | 83 | AA |
|  | 15 | 7 | 1.0 | 1.19 | 82 | AA |
|  | 16 | 8 | 1.0 | 1.20 | 74 | AA |
| Comparative Example 6 | 13 | 5 | 1.0 | 1.36 | 60 | A |
|  | 14 | 6 | 1.0 | 1.13 | 81 | A |
|  | 15 | 7 | 1.1 | 1.18 | 76 | A |
|  | 16 | 8 | 1.1 | 1.20 | 70 | A |
| Comparative Example 7 | 13 | 5 | 1.7 | 1.20 | 55 | C |
|  | 14 | 6 | 1.6 | 1.09 | 72 | B |
|  | 15 | 7 | 1.6 | 1.08 | 69 | C |
|  | 16 | 8 | 1.4 | 1.10 | 63 | B |
| Comparative Example 8 | 13 | 5 | 11.5 | 1.10 | 31 | D |
|  | 14 | 6 | 12.8 | 1.01 | 40 | D |
|  | 15 | 7 | 17.1 | 1.00 | 42 | D |
|  | 16 | 8 | 14.2 | 1.00 | 41 | D |

TABLE 8

Ink compositions of Example 2 (by weight %)

|  | Pigment | | | |
|---|---|---|---|---|
|  | PBk7 | PB15:4 | PR122 | PY180 |
| Dispersion 5 | 40 | — | — | — |
| Dispersion 6 | — | 23 | — | — |
| Dispersion 7 | — | — | 34 | — |
| Dispersion 8 | — | — | — | 41 |
| TEGmBE | 2 | 1 | 1 | 1 |
| 1,2-hexanediol | 3 | 4 | 4 | 4 |
| Glycerin | 10 | 15 | 10 | 10 |
| trimeghylolpropane | 4 | 7 | 5 | 5 |
| MPPD | 0.9 | 1.2 | 0.8 | 1.5 |
| Surfynol 104 | 0.15 | 0.15 | 0.15 | 0.15 |
| ion-exchanged water | residual amount | residual amount | residual amount | residual amount |

PB15:4 C.I. Pigment Blue15:4
PR122 C.I. Pigment Red122
PY180 C.I. Pigment Yellow180

TABLE 9

Ink compositions of Comparative Example 5 (by weight %)

|  | Pigment | | | |
|---|---|---|---|---|
|  | PBk7 | PB15:4 | PR122 | PY180 |
| Dispersion 1 | 35 | — | — | — |
| Dispersion 2 | — | 25 | — | — |
| Dispersion 3 | — | — | 30 | — |
| Dispersion 4 | — | — | — | 30 |
| TEGmBE | 2 | 1 | 1 | 1 |
| 1,2-HD | 3 | 4 | 4 | 4 |
| Glycerin | 11 | 16 | 11 | 11 |
| TMP | 4 | 7 | 5 | 5 |
| MPPD | — | — | — | — |
| S-104 | 0.15 | 0.15 | 0.15 | 0.15 |
| ion-exchanged water | residual amount | residual amount | residual amount | residual amount |

TABLE 10

Ink compositions of Comparative Example 6 (by weight %)

|  | Pigment | | | |
|---|---|---|---|---|
|  | PBk7 | PB15:4 | PR122 | PY180 |
| Dispersion 1 | 35 | — | — | — |
| Dispersion 2 | — | 25 | — | — |
| Dispersion 3 | — | — | 30 | — |
| Dispersion 4 | — | — | — | 30 |
| TEGmBE | 2 | 1 | 1 | 1 |
| 1,2-HD | — | — | — | — |
| Glycerin | 14 | 20 | 15 | 15 |
| TMP | 4 | 7 | 5 | 5 |
| MPPD | — | — | — | — |
| S-104 | 0.15 | 0.15 | 0.15 | 0.15 |
| ion-exchanged water | residual amount | residual amount | residual amount | residual amount |

TABLE 11

Ink compositions of Comparative Example 7 (by weight %)

|  | Pigment | | | |
|---|---|---|---|---|
|  | PBk7 | PB15:4 | PR122 | PY180 |
| Dispersion 1 | 35 | — | — | — |
| Dispersion 2 | — | 25 | — | — |
| Dispersion 3 | — | — | 30 | — |
| Dispersion 4 | — | — | — | 30 |
| TEGmBE | 2 | 1 | 1 | 1 |
| 1,2-HD | — | — | — | — |
| Glycerin | 14 | 19 | 15 | 16 |
| TMP | 4 | 7 | 5 | 5 |
| MPPD | — | — | — | — |
| S-104 | — | — | — | — |
| ion-exchanged water | residual amount | residual amount | residual amount | residual amount |

TABLE 12

Ink compositions of Comparative Example 8 (by weight %)

|  | Pigment | | | |
|---|---|---|---|---|
|  | PBk7 | PB15:4 | PR122 | PY180 |
| Dispersion 1 | 35 | — | — | — |
| Dispersion 2 | — | 25 | — | — |
| Dispersion 3 | — | — | 30 | — |

TABLE 12-continued

Ink compositions of Comparative Example 8 (by weight %)

|  | Pigment | | | |
| --- | --- | --- | --- | --- |
|  | PBk7 | PB15:4 | PR122 | PY180 |
| Dispersion 4 | — | — | — | 30 |
| TEGmBE | — | — | — | — |
| 1,2-HD | — | — | — | — |
| Glycerin | 15 | 20 | 15 | 15 |
| TMP | 4 | 7 | 5 | 5 |
| MPPD | — | — | — | — |
| S-104 | 0.01 | 0.01 | 0.01 | 0.01 |
| ion-exchanged water | residual amount | residual amount | residual amount | residual amount |

Examples 3 to 6

(1) Preparation of Ink Jet Recording Ink in which Added Amount of MPPD is Changed Examples 3 to 6 of favorable compositions as the ink jet recording ink and Reference Examples 1 and 2 in which the added amount of MPPD was changed were prepared by operating in the same manner as Example 1 except being based on Tables 14 to 19.

(2) Evaluation

The dispersion stability, OD on regular paper, glossiness on glossy paper and discharge stability of the prepared ink jet recording inks were evaluated by operating in the same manner as Example 1. The results are shown in Table 13.

TABLE 13

The result of Dispersion stability, Regular paper OD, Glossiness of gloss paper and Discharge stability in Example 3-6, Reference Example 1 and 2

|  | Ink | Dispersion | Dispersion stability | Regular paper OD | Glossiness of gloss paper | Discharge stability |
| --- | --- | --- | --- | --- | --- | --- |
| Example 3 | 17 | 1 | 1.0 | 1.38 | 70 | A |
|  | 18 | 2 | 1.0 | 1.23 | 92 | AA |
|  | 19 | 3 | 1.0 | 1.20 | 85 | AA |
|  | 20 | 4 | 1.0 | 1.22 | 80 | AA |
| Example 4 | 21 | 1 | 1.0 | 1.39 | 71 | A |
|  | 22 | 2 | 1.0 | 1.23 | 93 | AA |
|  | 23 | 3 | 1.0 | 1.21 | 87 | AA |
|  | 24 | 4 | 1.0 | 1.23 | 81 | AA |
| Example 5 | 25 | 1 | 1.0 | 1.41 | 72 | A |
|  | 26 | 2 | 1.0 | 1.27 | 94 | AA |
|  | 27 | 3 | 1.0 | 1.22 | 88 | AA |
|  | 28 | 4 | 1.0 | 1.26 | 85 | AA |
| Example 6 | 29 | 1 | 1.0 | 1.40 | 68 | A |
|  | 30 | 2 | 1.0 | 1.24 | 90 | AA |
|  | 31 | 3 | 1.0 | 1.21 | 83 | AA |
|  | 32 | 4 | 1.0 | 1.20 | 79 | AA |
| Reference Example 1 | 33 | 1 | 1.0 | 1.26 | 62 | A |
|  | 34 | 2 | 1.0 | 1.10 | 76 | AA |
|  | 55 | 3 | 1.0 | 1.10 | 79 | AA |
|  | 36 | 4 | 1.0 | 1.15 | 74 | AA |
| Reference Example 2 | 37 | 1 | 2.2 | 1.25 | 51 | C |
|  | 38 | 2 | 4.3 | 1.15 | 62 | B |
|  | 39 | 3 | 6.0 | 1.10 | 69 | C |
|  | 40 | 4 | 2.3 | 1.12 | 63 | C |

TABLE 14

Ink compositions of Example 3 (by weight %)

| Pigment | PBk7 | PB15:1 | PV19 | PY74 |
| --- | --- | --- | --- | --- |
| Dispersion 1 | 35 | — | — | — |
| Dispersion 2 | — | 25 | — | — |
| Dispersion 3 | — | — | 30 | — |
| Dispersion 4 | — | — | — | 30 |
| TEGmBE | 2 | 1 | 1 | 1 |
| 1,2-HD | 3 | 4 | 4 | 4 |
| Glycerin | 11 | 16 | 11 | 11 |
| TMP | 4 | 7 | 5 | 5 |
| MPPD | 0.1 | 0.1 | 0.1 | 0.1 |
| S-104 | 0.15 | 0.15 | 0.15 | 0.15 |
| ion-exchanged water | residual amount | residual amount | residual amount | residual amount |

TABLE 15

Ink compositions of Example 4 (by weight %)

| Pigment | PBk7 | PB15:1 | PV19 | PY74 |
| --- | --- | --- | --- | --- |
| Dispersion 1 | 35 | — | — | — |
| Dispersion 2 | — | 25 | — | — |
| Dispersion 3 | — | — | 30 | — |
| Dispersion 4 | — | — | — | 30 |
| TEGmBE | 2 | 1 | 1 | 1 |
| 1,2-HD | 3 | 4 | 4 | 4 |
| Glycerin | 10 | 15 | 10 | 10 |
| TMP | 4.5 | 7.5 | 5.5 | 5.5 |
| MPPD | 0.3 | 0.3 | 0.3 | 0.3 |
| S-104 | 0.15 | 0.15 | 0.15 | 0.15 |
| ion-exchanged water | residual amount | residual amount | residual amount | residual amount |

TABLE 16

Ink compositions of Example 5 (by weight %)

| Pigment | PBk7 | PB15:1 | PV19 | PY74 |
| --- | --- | --- | --- | --- |
| Dispersion 1 | 35 | — | — | — |
| Dispersion 2 | — | 25 | — | — |
| Dispersion 3 | — | — | 30 | — |
| Dispersion 4 | — | — | — | 30 |
| TEGmBE | 2 | 1 | 1 | 1 |
| 1,2-HD | 3 | 4 | 4 | 4 |
| Glycerin | 10 | 15 | 10 | 10 |
| TMP | 4 | 7 | 5 | 5 |
| MPPD | 1.0 | 1.0 | 1.0 | 1.0 |
| S-104 | 0.15 | 0.15 | 0.15 | 0.15 |
| ion-exchanged water | residual amount | residual amount | residual amount | residual amount |

TABLE 17

Ink compositions of Example 6 (by weight %)

| Pigment | PBk7 | PB15:1 | PV19 | PY74 |
| --- | --- | --- | --- | --- |
| Dispersion 1 | 35 | — | — | — |
| Dispersion 2 | — | 25 | — | — |
| Dispersion 3 | — | — | 30 | — |
| Dispersion 4 | — | — | — | 30 |
| TEGmBE | 2 | 1 | 1 | 1 |
| 1,2-HD | 3 | 4 | 4 | 4 |
| Glycerin | 10 | 15 | 10 | 10 |
| TMP | 2 | 5 | 3 | 3 |
| MPPD | 2.0 | 2.0 | 2.0 | 2.0 |

TABLE 17-continued

Ink compositions of Example 6 (by weight %)

| Pigment | PBk7 | PB15:1 | PV19 | PY74 |
|---|---|---|---|---|
| S-104 | 0.15 | 0.15 | 0.15 | 0.15 |
| ion-exchanged water | residual amount | residual amount | residual amount | residual amount |

TABLE 18

Ink compositions of Reference Example 1 (by weight %)

| Pigment | PBk7 | PB15:1 | PV19 | PY74 |
|---|---|---|---|---|
| Dispersion 1 | 35 | — | — | — |
| Dispersion 2 | — | 25 | — | — |
| Dispersion 3 | — | — | 30 | — |
| Dispersion 4 | — | — | — | 30 |
| TEGmBE | 2 | 1 | 1 | 1 |
| 1,2-HD | 3 | 4 | 4 | 4 |
| Glycerin | 11 | 16 | 11 | 11 |
| TMP | 4 | 7 | 5 | 5 |
| MPPD | 0.05 | 0.05 | 0.05 | 0.05 |
| S-104 | 0.15 | 0.15 | 0.15 | 0.15 |
| ion-exchanged water | residual amount | residual amount | residual amount | residual amount |

TABLE 19

Ink compositions of Reference Example 2 (by weight %)

| Pigment | PBk7 | PB15:1 | PV19 | PY74 |
|---|---|---|---|---|
| Dispersion 1 | 35 | — | — | — |
| Dispersion 2 | — | 25 | — | — |
| Dispersion 3 | — | — | 30 | — |
| Dispersion 4 | — | — | — | 30 |
| TEGmBE | 2 | 1 | 1 | 1 |
| 1,2-HD | 3 | 4 | 4 | 4 |
| Glycerin | 10 | 15 | 10 | 10 |
| TMP | 2 | 5 | 2 | 2 |
| MPPD | 2.5 | 2.7 | 2.9 | 3.1 |
| S-104 | 0.15 | 0.15 | 0.15 | 0.15 |
| ion-exchanged water | residual amount | residual amount | residual amount | residual amount |

Examples 7 to 12

An ink of Example 7, an ink of Example 8 and inks of Example 9 to 12 were respectively prepared in the same manner as Example 1, Example 2 and Examples 3 to 6. Referring to Comparative Examples, inks of Comparative Examples 9 to 12 (corresponding to Comparative Examples 1 to 4), Comparative Examples 13 to 16 (corresponding to Comparative Examples 5 to 8) and Reference Examples 3 and 4 (corresponding to Reference Examples 1 and 2) were simultaneously prepared with the preparation of ink of each of the Examples. The dispersion stability, OD on regular paper, glossiness on glossy paper and discharge stability of these inks were evaluated by operating in the same manner as Example 1 except the printing number of sheets was set to 100 to 500 pages in the evaluation of the discharge stability. The results are shown in Tables 20 to 22.

TABLE 20

| | Ink | Dispersion | Dispersion stability | Regular paper OD | Glossiness of gloss paper | Discharge stability |
|---|---|---|---|---|---|---|
| Example 7 | 1 | 1 | 1.0 | 1.40 | 71 | B |
| | 2 | 2 | 1.0 | 1.25 | 94 | A |
| | 3 | 3 | 1.0 | 1.20 | 89 | A |
| | 4 | 4 | 1.0 | 1.25 | 83 | A |
| Comparative Example 9 | 5 | 1 | 1.0 | 1.37 | 69 | B |
| | 6 | 2 | 1.0 | 1.14 | 83 | A |
| | 7 | 3 | 1.0 | 1.19 | 82 | A |
| | 8 | 4 | 1.0 | 1.20 | 74 | A |
| Comparative Example 10 | 9 | 1 | 1.0 | 1.36 | 60 | B |
| | 10 | 2 | 1.0 | 1.13 | 81 | B |
| | 11 | 3 | 1.1 | 1.18 | 76 | B |
| | 12 | 4 | 1.1 | 1.20 | 70 | B |
| Comparative Example 11 | 13 | 1 | 1.7 | 1.20 | 55 | D |
| | 14 | 2 | 1.6 | 1.09 | 72 | C |
| | 15 | 3 | 1.6 | 1.08 | 69 | D |
| | 16 | 4 | 1.4 | 1.10 | 63 | C |
| Comparative Example 12 | 17 | 1 | 12.9 | 1.10 | 31 | D |
| | 18 | 2 | 14.8 | 1.01 | 40 | D |
| | 19 | 3 | 16.0 | 1.00 | 42 | D |
| | 20 | 4 | 11.3 | 1.00 | 41 | D |

TABLE 21

| | Ink | Dispersion | Dispersion stability | Regular paper OD | Glossiness of gloss paper | Discharge stability |
|---|---|---|---|---|---|---|
| Example 8 | 9 | 5 | 1.0 | 1.40 | 71 | B |
| | 10 | 6 | 1.0 | 1.25 | 94 | A |
| | 11 | 7 | 1.0 | 1.20 | 89 | A |
| | 12 | 8 | 1.0 | 1.25 | 83 | A |
| Comparative Example 13 | 13 | 5 | 1.0 | 1.37 | 69 | B |
| | 14 | 6 | 1.0 | 1.14 | 83 | A |
| | 15 | 7 | 1.0 | 1.19 | 82 | A |
| | 16 | 8 | 1.0 | 1.20 | 74 | A |
| Comparative Example 14 | 13 | 5 | 1.0 | 1.36 | 60 | B |
| | 14 | 6 | 1.0 | 1.13 | 81 | B |
| | 15 | 7 | 1.1 | 1.18 | 76 | B |
| | 16 | 8 | 1.1 | 1.20 | 70 | B |
| Comparative Example 15 | 13 | 5 | 1.7 | 1.20 | 55 | D |
| | 14 | 6 | 1.6 | 1.09 | 72 | C |
| | 15 | 7 | 1.6 | 1.08 | 69 | D |
| | 16 | 8 | 1.4 | 1.10 | 63 | C |
| Comparative Example 16 | 13 | 5 | 11.5 | 1.10 | 31 | D |
| | 14 | 6 | 12.8 | 1.01 | 40 | D |
| | 15 | 7 | 17.1 | 1.00 | 42 | D |
| | 16 | 8 | 14.2 | 1.00 | 41 | D |

TABLE 22

| | Ink | Dispersion | Dispersion stability | Regular paper OD | Glossiness of gloss paper | Discharge stability |
|---|---|---|---|---|---|---|
| Example 9 | 17 | 1 | 1.0 | 1.38 | 70 | B |
| | 18 | 2 | 1.0 | 1.23 | 92 | A |
| | 19 | 3 | 1.0 | 1.20 | 85 | A |
| | 20 | 4 | 1.0 | 1.22 | 80 | A |
| Example 10 | 21 | 1 | 1.0 | 1.39 | 71 | B |
| | 22 | 2 | 1.0 | 1.23 | 93 | A |
| | 23 | 3 | 1.0 | 1.21 | 87 | A |
| | 24 | 4 | 1.0 | 1.23 | 81 | A |
| Example 11 | 25 | 1 | 1.0 | 1.41 | 72 | B |
| | 26 | 2 | 1.0 | 1.27 | 94 | A |
| | 27 | 3 | 1.0 | 1.22 | 88 | A |
| | 28 | 4 | 1.0 | 1.26 | 85 | A |
| Example 12 | 29 | 1 | 1.0 | 1.40 | 68 | B |
| | 30 | 2 | 1.0 | 1.24 | 90 | A |
| | 31 | 3 | 1.0 | 1.21 | 83 | A |
| | 32 | 4 | 1.0 | 1.20 | 79 | A |

TABLE 22-continued

| Ink | Dispersion | Dispersion stability | Regular paper OD | Glossiness of gloss paper | Discharge stability |
|---|---|---|---|---|---|
| Reference Example 3 | 33 | 1 | 1.0 | 1.26 | 62 | B |
| | 34 | 2 | 1.0 | 1.10 | 76 | A |
| | 55 | 3 | 1.0 | 1.10 | 79 | A |
| | 36 | 4 | 1.0 | 1.15 | 74 | A |
| Reference Example 4 | 37 | 1 | 2.2 | 1.25 | 51 | D |
| | 38 | 2 | 4.3 | 1.15 | 62 | C |
| | 39 | 3 | 6.0 | 1.10 | 69 | D |
| | 40 | 4 | 2.3 | 1.12 | 63 | D |

Example II

Examples 1 to 6 of Example II relate to the preparation and evaluation of ink jet recording inks using 2,2-dibutyl-1,3-propanediol (DBPD).

Example 1

(1) Manufacturing of Dispersions 1 to 4

Dispersions 1 to 4 were prepared as in Example 1 of Example I.

(2) Preparation of Ink Jet Recording Ink Favorable examples of compositions as ink jet recording ink are shown in Table 24. Ink jet recording inks of Example 1 were prepared by mixing the dispersions 1 to 4 with vehicle components shown in Table 24. 0.05% of Topside 240 (manufactured by Permachem Asia Ltd.) in ion-exchanged water for prevention of corrosion of ink, 0.02% of benzotriazole in ion-exchanged water for prevention of corrosion of ink jet headparts, and 0.04% of EDTA (ethylenediamine tetraacetic acid)·2Na salt in ion-exchanged water for reducing the effects of metal ions in the ink system were used in the residual quantity of water in Table 21. Also, ink jet recording inks of Comparative Examples 1 to 4 were simultaneously prepared in the same manner as Example 1 except being based on the compositions of Tables 25 to 28.

(3) Evaluation

The dispersion stability, OD on regular paper, glossiness on glossy paper and discharge stability of the prepared ink jet recording inks were evaluated by operating in the same manner as Example 1 of Example I. The results are shown in Table 23.

TABLE 23

The result of Dispersion stability, Regular paper OD, Glossiness of gloss paper and Discharge stability Example 1, Comparative Example 1-4

| | Ink | Dispersion | Dispersion stability | Regular paper OD | Glossiness of gloss paper | Discharge stability |
|---|---|---|---|---|---|---|
| Example 1 | 1 | 1 | 1.0 | 1.40 | 71 | A |
| | 2 | 2 | 1.0 | 1.25 | 94 | AA |
| | 3 | 3 | 1.0 | 1.20 | 89 | AA |
| | 4 | 4 | 1.0 | 1.25 | 83 | AA |
| Comparative Example 1 | 5 | 1 | 1.0 | 1.37 | 69 | A |
| | 6 | 2 | 1.0 | 1.14 | 83 | AA |
| | 7 | 3 | 1.0 | 1.19 | 82 | AA |
| | 8 | 4 | 1.0 | 1.20 | 74 | AA |
| Comparative Example 2 | 9 | 1 | 1.0 | 1.36 | 60 | A |
| | 10 | 2 | 1.0 | 1.13 | 81 | A |
| | 11 | 3 | 1.1 | 1.18 | 76 | A |
| | 12 | 4 | 1.1 | 1.20 | 70 | A |
| Comparative Example 3 | 13 | 1 | 1.7 | 1.20 | 55 | C |
| | 14 | 2 | 1.6 | 1.09 | 72 | B |
| | 15 | 3 | 1.6 | 1.08 | 69 | C |
| | 16 | 4 | 1.4 | 1.10 | 63 | B |
| Comparative Example 4 | 17 | 1 | 12.9 | 1.10 | 31 | D |
| | 18 | 2 | 14.8 | 1.01 | 40 | D |
| | 19 | 3 | 16.0 | 1.00 | 42 | D |
| | 20 | 4 | 11.3 | 1.00 | 41 | D |

TABLE 24

Ink compositions of Example 1 (by weight %)

| Pigment | PBk7 | PB15:1 | PV19 | PY74 |
|---|---|---|---|---|
| Dispersion 1 | 35 | — | — | — |
| Dispersion 2 | — | 25 | — | — |
| Dispersion 3 | — | — | 30 | — |
| Dispersion 4 | — | — | — | 30 |
| TEGmBE | 2 | 1 | 1 | 1 |
| 1,2-HD | 3 | 4 | 4 | 4 |
| Glycerin | 10 | 15 | 10 | 10 |
| TMP | 4 | 7 | 5 | 5 |
| DBPD | 0.3 | 0.5 | 0.7 | 1.0 |
| S-104 | 0.15 | 0.15 | 0.15 | 0.15 |
| ion-exchanged water | residual amount | residual amount | residual amount | residual amount |

TEGmBE triethylene glycol monobutyl ether
1,2-HD 1,2-hexanediol
TMP trimeghylolpropane
DBPD 2-dibutyl-1,3-propanediol
S-104 Surfynol104
PBk7 C.I. Pigment Black7
PB15:1 C.I. Pigment Blue15:1
PV19 C.I. Pigment Violet19
PY74 C.I. Pigment Yellow74
Surfynol 104 acetylene glycol surfactant manufactured by Nissin Chemical Industry Corporation

TABLE 25

Ink compositions of Comparative Example 1 (by weight %)

| pigment | PBk7 | PB15:1 | PV19 | PY74 |
|---|---|---|---|---|
| Dispersion 1 | 35 | — | — | — |
| Dispersion 2 | — | 25 | — | — |
| Dispersion 3 | — | — | 30 | — |
| Dispersion 4 | — | — | — | 30 |
| TEGmBE | 2 | 1 | 1 | 1 |
| 1,2-HD | 3 | 4 | 4 | 4 |
| Glycerin | 11 | 16 | 11 | 11 |
| TMP | 4 | 7 | 5 | 5 |
| DBPD | — | — | — | — |
| S-104 | 0.15 | 0.15 | 0.15 | 0.15 |
| ion-exchanged water | residual amount | residual amount | residual amount | residual amount |

TABLE 26

Ink compositions of Comparative Example 2 (by weight %)

| Pigment | PBk7 | PB15:1 | PV19 | PY74 |
|---|---|---|---|---|
| Dispersion 1 | 35 | — | — | — |
| Dispersion 2 | — | 25 | — | — |
| Dispersion 3 | — | — | 30 | — |
| Dispersion 4 | — | — | — | 30 |
| TEGmBE | 2 | 1 | 1 | 1 |
| 1,2-HD | — | — | — | — |
| Glycerin | 14 | 20 | 15 | 15 |
| TMP | 4 | 7 | 5 | 5 |
| DBPD | — | — | — | — |
| S-104 | 0.15 | 0.15 | 0.15 | 0.15 |
| ion-exchanged water | residual amount | residual amount | residual amount | residual amount |

TABLE 27

Ink compositions of Comparative Example 3 (by weight %)

| Pigment | PBk7 | PB15:1 | PV19 | PY74 |
|---|---|---|---|---|
| Dispersion 1 | 35 | — | — | — |
| Dispersion 2 | — | 25 | — | — |
| Dispersion 3 | — | — | 30 | — |
| Dispersion 4 | — | — | — | 30 |
| TEGmBE | 2 | 1 | 1 | 1 |
| 1,2-HD | — | — | — | — |
| Glycerin | 14 | 19 | 15 | 16 |
| TMP | 4 | 7 | 5 | 5 |
| DBPD | — | — | — | — |
| S-104 | — | — | — | — |
| ion-exchanged water | residual amount | residual amount | residual amount | residual amount |

TABLE 28

Ink compositions of Comparative Example 4 (by weight %)

| Pigment | PBk7 | PB15:1 | PV19 | PY74 |
|---|---|---|---|---|
| Dispersion 1 | 35 | — | — | — |
| Dispersion 2 | — | 25 | — | — |
| Dispersion 3 | — | — | 30 | — |
| Dispersion 4 | — | — | — | 30 |
| TEGmBE | — | — | — | — |
| 1,2-HD | — | — | — | — |
| Glycerin | 15 | 20 | 15 | 15 |
| TMP | 4 | 7 | 5 | 5 |
| DBPD | — | — | — | — |
| S-104 | 0.01 | 0.01 | 0.01 | 0.01 |
| ion-exchanged water | residual amount | residual amount | residual amount | residual amount |

Example 2

(1) Manufacturing of Dispersions 5 to 8

Dispersions 5 to 8 were prepared in the same manner as Example 2 of Example I.

(2) Preparation of Ink Jet Recording Ink

Favorable examples of compositions as ink jet recording ink are shown in Table 30. Ink jet recording inks of this Example were prepared by operating in the same manner as Example 1 except being based on the compositions of Table 30. Ink jet recording inks of Comparative Examples 5 to 8 were simultaneously prepared in the same manner as Example 1 except being based on the compositions of Tables 31 to 34.

(3) Evaluation

The dispersion stability, OD on regular paper, glossiness on glossy paper and discharge stability of the prepared ink jet recording inks were evaluated by operating in the same manner as Example 1 of Example I. The results are shown in Table 29.

TABLE 29

The result of Dispersion stability, Regular paper OD, Glossiness of gloss paper and Discharge stability in Example 2, Comparative Example 5-8

| | Ink | Dispersion | Dispersion stability | Regular paper OD | Glossiness of gloss paper | Discharge stability |
|---|---|---|---|---|---|---|
| Example 2 | 9 | 5 | 1.0 | 1.40 | 71 | A |
| | 10 | 6 | 1.0 | 1.25 | 94 | AA |
| | 11 | 7 | 1.0 | 1.20 | 89 | AA |
| | 12 | 8 | 1.0 | 1.25 | 83 | AA |
| Comparative Example 5 | 13 | 5 | 1.0 | 1.37 | 69 | A |
| | 14 | 6 | 1.0 | 1.14 | 83 | AA |
| | 15 | 7 | 1.0 | 1.19 | 82 | AA |
| | 16 | 8 | 1.0 | 1.20 | 74 | AA |
| Comparative Example 6 | 13 | 5 | 1.0 | 1.36 | 60 | A |
| | 14 | 6 | 1.0 | 1.13 | 81 | A |
| | 15 | 7 | 1.1 | 1.18 | 76 | A |
| | 16 | 8 | 1.1 | 1.20 | 70 | A |
| Comparative Example 7 | 13 | 5 | 1.7 | 1.20 | 55 | C |
| | 14 | 6 | 1.6 | 1.09 | 72 | B |
| | 15 | 7 | 1.6 | 1.08 | 69 | C |
| | 16 | 8 | 1.4 | 1.10 | 63 | B |
| Comparative Example 8 | 13 | 5 | 11.5 | 1.10 | 31 | D |
| | 14 | 6 | 12.8 | 1.01 | 40 | D |
| | 15 | 7 | 17.1 | 1.00 | 42 | D |
| | 16 | 8 | 14.2 | 1.00 | 41 | D |

TABLE 30

Ink compositions of Example 2 (by weight %)

| Pigment | PBk7 | PB15:4 | PR122 | PY180 |
|---|---|---|---|---|
| Dispersion 5 | 40 | — | — | — |
| Dispersion 6 | — | 23 | — | — |
| Dispersion 7 | — | — | 34 | — |
| Dispersion 8 | — | — | — | 41 |
| TEGmBE | 2 | 1 | 1 | 1 |
| 1,2-hexandiol | 3 | 4 | 4 | 4 |
| Glycerin | 10 | 15 | 10 | 10 |
| trimeghylolpropane | 4 | 7 | 5 | 5 |
| DBPD | 0.6 | 1.0 | 0.6 | 1.1 |
| Surfynol 104 | 0.15 | 0.15 | 0.15 | 0.15 |
| ion-exchanged water | residual amount | residual amount | residual amount | residual amount |

PB15:4 C.I. Pigment Blue15:4
PR122 C.I. Pigment Red122
PY180 C.I. Pigment Yellow180

TABLE 31

Ink compositions of Comparative Example 5 (by weight %)

| Pigment | PBk7 | PB15:4 | PR122 | PY180 |
|---|---|---|---|---|
| Dispersion 1 | 35 | — | — | — |
| Dispersion 2 | — | 25 | — | — |
| Dispersion 3 | — | — | 30 | — |
| Dispersion 4 | — | — | — | 30 |
| TEGmBE | 2 | 1 | 1 | 1 |
| 1,2-HD | 3 | 4 | 4 | 4 |
| Glycerin | 11 | 16 | 11 | 11 |
| TMP | 4 | 7 | 5 | 5 |
| DBPD | — | — | — | — |
| S-104 | 0.15 | 0.15 | 0.15 | 0.15 |

TABLE 31-continued

Ink compositions of Comparative Example 5 (by weight %)

| Pigment | PBk7 | PB15:4 | PR122 | PY180 |
|---|---|---|---|---|
| ion-exchanged water | residual amount | residual amount | residual amount | residual amount |

TABLE 32

Ink compositions of Comparative Example 6 (by weight %)

| Pigment | PBk7 | PB15:4 | PR122 | PY180 |
|---|---|---|---|---|
| Dispersion 1 | 35 | — | — | — |
| Dispersion 2 | — | 25 | — | — |
| Dispersion 3 | — | — | 30 | — |
| Dispersion 4 | — | — | — | 30 |
| TEGmBE | 2 | 1 | 1 | 1 |
| 1,2-HD | — | — | — | — |
| Glycerin | 14 | 20 | 15 | 15 |
| TMP | 4 | 7 | 5 | 5 |
| DBPD | — | — | — | — |
| S-104 | 0.15 | 0.15 | 0.15 | 0.15 |
| ion-exchanged water | residual amount | residual amount | residual amount | residual amount |

TABLE 33

Ink compositions of Comparative Example 7 (by weight %)

| Pigment | PBk7 | PB15:4 | PR122 | PY180 |
|---|---|---|---|---|
| Dispersion 1 | 35 | — | — | — |
| Dispersion 2 | — | 25 | — | — |
| Dispersion 3 | — | — | 30 | — |
| Dispersion 4 | — | — | — | 30 |
| TEGmBE | 2 | 1 | 1 | 1 |
| 1,2-HD | — | — | — | — |
| Glycerin | 14 | 19 | 15 | 16 |
| TMP | 4 | 7 | 5 | 5 |
| DBPD | — | — | — | — |
| S-104 | — | — | — | — |
| ion-exchanged water | residual amount | residual amount | residual amount | residual amount |

TABLE 34

Ink compositions of Comparative Example 8 (by weight %)

| Pigment | PBk7 | PB15:4 | PR122 | PY180 |
|---|---|---|---|---|
| Dispersion 1 | 35 | — | — | — |
| Dispersion 2 | — | 25 | — | — |
| Dispersion 3 | — | — | 30 | — |
| Dispersion 4 | — | — | — | 30 |
| TEGmBE | '3 | — | — | — |
| 1,2-HD | — | — | — | — |
| Glycerin | 15 | 20 | 15 | 15 |
| TMP | 4 | 7 | 5 | 5 |
| DBPD | — | — | — | — |
| S-104 | 0.01 | 0.01 | 0.01 | 0.01 |
| ion-exchanged water | residual amount | residual amount | residual amount | residual amount |

Examples 3 to 6

(1) Preparation of Ink Jet Recording Ink in which Added Amount of DBPD is Changed Examples 3 to 6 of favorable compositions as the ink jet recording ink and Comparative examples 9 and 10 in which the added amount of DBPD was changed were prepared by operating in the same manner as Example 1 except being based on Tables 36 to 41.

(2) Evaluation

The dispersion stability, OD on regular paper, glossiness on glossy paper and discharge stability of the prepared ink jet recording inks were evaluated by operating in the same manner as Example 1 of Example I. The results are shown in Table 35.

TABLE 35

The result of Dispersion stability, Regular paper OD, Glossiness of gloss paper and Discharge stability in Example 3-6, Comparative Example 9 and 10

| | Ink | Dispersion | Dispersion stability | Regular paper OD | Glossiness of gloss paper | Discharge stability |
|---|---|---|---|---|---|---|
| Example 3 | 17 | 1 | 1.0 | 1.38 | 70 | A |
| | 18 | 2 | 1.0 | 1.23 | 92 | AA |
| | 19 | 3 | 1.0 | 1.20 | 85 | AA |
| | 20 | 4 | 1.0 | 1.22 | 80 | AA |
| Example 4 | 21 | 1 | 1.0 | 1.39 | 71 | A |
| | 22 | 2 | 1.0 | 1.23 | 93 | AA |
| | 23 | 3 | 1.0 | 1.21 | 87 | AA |
| | 24 | 4 | 1.0 | 1.23 | 81 | AA |
| Example 5 | 25 | 1 | 1.0 | 1.41 | 72 | A |
| | 26 | 2 | 1.0 | 1.27 | 94 | AA |
| | 27 | 3 | 1.0 | 1.22 | 88 | AA |
| | 28 | 4 | 1.0 | 1.26 | 85 | AA |
| Example 6 | 29 | 1 | 1.0 | 1.40 | 68 | A |
| | 30 | 2 | 1.0 | 1.24 | 90 | AA |
| | 31 | 3 | 1.0 | 1.21 | 83 | AA |
| | 32 | 4 | 1.0 | 1.20 | 79 | AA |
| Reference Example 1 | 33 | 1 | 1.0 | 1.26 | 62 | A |
| | 34 | 2 | 1.0 | 1.10 | 76 | AA |
| | 35 | 3 | 1.0 | 1.10 | 79 | AA |
| | 36 | 4 | 1.0 | 1.15 | 74 | AA |
| Reference Example 2 | 37 | 1 | 2.2 | 1.25 | 51 | C |
| | 38 | 2 | 4.3 | 1.15 | 62 | B |
| | 39 | 3 | 6.0 | 1.10 | 69 | C |
| | 40 | 4 | 2.3 | 1.12 | 63 | C |

TABLE 36

Ink compositions of Example 3 (by weight %)

| Pigment | PBk7 | PB15:1 | PV19 | PY74 |
|---|---|---|---|---|
| Dispersion 1 | 35 | — | — | — |
| Dispersion 2 | — | 25 | — | — |
| Dispersion 3 | — | — | 30 | — |
| Dispersion 4 | — | — | — | 30 |
| TEGmBE | 2 | 1 | 1 | 1 |
| 1,2-HD | 3 | 4 | 4 | 4 |
| Glycerin | 11 | 16 | 11 | 11 |
| TMP | 4 | 7 | 5 | 5 |
| DBPD | 0.1 | 0.1 | 0.1 | 0.1 |
| S-104 | 0.15 | 0.15 | 0.15 | 0.15 |
| ion-exchanged water | residual amount | residual amount | residual amount | residual amount |

TABLE 37

Ink compositions of Example 4 (by weight %)

| Pigment | PBk7 | PB15:1 | PV19 | PY74 |
|---|---|---|---|---|
| Dispersion 1 | 35 | — | — | — |
| Dispersion 2 | — | 25 | — | — |
| Dispersion 3 | — | — | 30 | — |
| Dispersion 4 | — | — | — | 30 |

TABLE 37-continued

Ink compositions of Example 4 (by weight %)

| Pigment | PBk7 | PB15:1 | PV19 | PY74 |
|---|---|---|---|---|
| TEGmBE | 2 | 1 | 1 | 1 |
| 1,2-HD | 3 | 4 | 4 | 4 |
| Glycerin | 10 | 15 | 10 | 10 |
| TMP | 4.5 | 7.5 | 5.5 | 5.5 |
| DBPD | 0.3 | 0.3 | 0.3 | 0.3 |
| S-104 | 0.15 | 0.15 | 0.15 | 0.15 |
| ion-exchanged water | residual amount | residual amount | residual amount | residual amount |

TABLE 38

Ink compositions of Example 5 (by weight %)

| Pigment | PBk7 | PB15:1 | PV19 | PY74 |
|---|---|---|---|---|
| Dispersion 1 | 35 | — | — | — |
| Dispersion 2 | — | 25 | — | — |
| Dispersion 3 | — | — | 30 | — |
| Dispersion 4 | — | — | — | 30 |
| TEGmBE | 2 | 1 | 1 | 1 |
| 1,2-HD | 3 | 4 | 4 | 4 |
| Glycerin | 10 | 15 | 10 | 10 |
| TMP | 4 | 7 | 5 | 5 |
| DBPD | 1.0 | 1.0 | 1.0 | 1.0 |
| S-104 | 0.15 | 0.15 | 0.15 | 0.15 |
| ion-exchanged water | residual amount | residual amount | residual amount | residual amount |

TABLE 39

Ink compositions of Example 6 (by weight %)

| Pigment | PBk7 | PB15:1 | PV19 | PY74 |
|---|---|---|---|---|
| Dispersion 1 | 35 | — | — | — |
| Dispersion 2 | — | 25 | — | — |
| Dispersion 3 | — | — | 30 | — |
| Dispersion 4 | — | — | — | 30 |
| TEGmBE | 2 | 1 | 1 | 1 |
| 1,2-HD | 3 | 4 | 4 | 4 |
| Glycerin | 10 | 15 | 10 | 10 |
| TMP | 2 | 5 | 3 | 3 |
| DBPD | 1.5 | 1.5 | 1.5 | 1.5 |
| S-104 | 0.15 | 0.15 | 0.15 | 0.15 |
| ion-exchanged water | residual amount | residual amount | residual amount | residual amount |

TABLE 40

Ink compositions of Comparative Example 9 (by weight %)

| Pigment | PBk7 | PB15:1 | PV19 | PY74 |
|---|---|---|---|---|
| Dispersion 1 | 35 | — | — | — |
| Dispersion 2 | — | 25 | — | — |
| Dispersion 3 | — | — | 30 | — |
| Dispersion 4 | — | — | — | 30 |
| TEGmBE | 2 | 1 | 1 | 1 |
| 1,2-HD | 3 | 4 | 4 | 4 |
| Glycerin | 11 | 16 | 11 | 11 |
| TMP | 4 | 7 | 5 | 5 |
| DBPD | — | — | — | — |
| S-104 | 0.15 | 0.15 | 0.15 | 0.15 |
| ion-exchanged water | residual amount | residual amount | residual amount | residual amount |

TABLE 41

Ink compositions of Comparative Example 10 (by weight %)

| Pigment | PBk7 | PB15:1 | PV19 | PY74 |
|---|---|---|---|---|
| Dispersion 1 | 35 | — | — | — |
| Dispersion 2 | — | 25 | — | — |
| Dispersion 3 | — | — | 30 | — |
| Dispersion 4 | — | — | — | 30 |
| TEGmBE | 2 | 1 | 1 | 1 |
| 1,2-HD | 3 | 4 | 4 | 4 |
| Glycerin | 10 | 15 | 10 | 10 |
| TMP | 2 | 5 | 2 | 2 |
| DBPD | — | — | — | — |
| S-104 | 0.15 | 0.15 | 0.15 | 0.15 |
| ion-exchanged water | residual amount | residual amount | residual amount | residual amount |

Examples 7, 8

An ink of Example 7 was prepared in the same manner as Example 1, and an ink of Example 8 was prepared in the same manner as Example 2. Referring to Comparative Examples, inks of Comparative Examples 11 to 14 (corresponding to Comparative Examples 1 to 4), and Comparative Examples 15 to 18 (corresponding to Comparative Examples 5 to 8) were simultaneously prepared with the preparation of ink of each of the Examples. The dispersion stability, OD on regular paper, glossiness on glossy paper and discharge stability of these inks were evaluated by operating in the same manner as Example 1 except the printing number of sheets was set to 100 to 500 pages in the evaluation of the discharge stability. The results are shown in Tables 42 to 43.

TABLE 42

| | Ink | Dispersion | Dispersion stability | Regular paper OD | Glossiness of gloss paper | Discharge stability |
|---|---|---|---|---|---|---|
| Example 7 | 1 | 1 | 1.0 | 1.40 | 69 | A |
| | 2 | 2 | 1.0 | 1.25 | 91 | AA |
| | 3 | 3 | 1.0 | 1.20 | 87 | AA |
| | 4 | 4 | 1.0 | 1.25 | 80 | AA |
| Comparative Example 11 | 5 | 1 | 1.0 | 1.37 | 65 | A |
| | 6 | 2 | 1.0 | 1.14 | 80 | AA |
| | 7 | 3 | 1.0 | 1.19 | 78 | AA |
| | 8 | 4 | 1.0 | 1.20 | 71 | AA |
| Comparative Example 12 | 9 | 1 | 1.0 | 1.36 | 54 | A |
| | 10 | 2 | 1.0 | 1.13 | 77 | A |
| | 11 | 3 | 1.1 | 1.18 | 72 | A |
| | 12 | 4 | 1.1 | 1.20 | 65 | A |
| Comparative Example 13 | 13 | 1 | 1.7 | 1.20 | 51 | C |
| | 14 | 2 | 1.6 | 1.09 | 70 | B |
| | 15 | 3 | 1.6 | 1.08 | 67 | C |
| | 16 | 4 | 1.4 | 1.10 | 60 | B |
| Comparative Example 14 | 17 | 1 | 12.9 | 1.10 | 30 | D |
| | 18 | 2 | 14.8 | 1.01 | 38 | D |
| | 19 | 3 | 16.0 | 1.00 | 39 | D |
| | 20 | 4 | 11.3 | 1.00 | 38 | D |

TABLE 43

| | Ink | Dispersion | Dispersion stability | Regular paper OD | Glossiness of gloss paper | Discharge stability |
|---|---|---|---|---|---|---|
| Example 8 | 9 | 5 | 1.0 | 1.40 | 69 | A |
| | 10 | 6 | 1.0 | 1.25 | 91 | AA |
| | 11 | 7 | 1.0 | 1.20 | 87 | AA |
| | 12 | 8 | 1.0 | 1.25 | 80 | AA |

TABLE 43-continued

| | Ink | Dispersion | Dispersion stability | Regular paper OD | Glossiness of gloss paper | Discharge stability |
|---|---|---|---|---|---|---|
| Comparative Example 15 | 13 | 5 | 1.0 | 1.37 | 67 | A |
| | 14 | 6 | 1.0 | 1.14 | 80 | AA |
| | 15 | 7 | 1.0 | 1.19 | 79 | AA |
| | 16 | 8 | 1.0 | 1.20 | 71 | AA |
| Comparative Example 16 | 13 | 5 | 1.0 | 1.36 | 57 | A |
| | 14 | 6 | 1.0 | 1.13 | 77 | A |
| | 15 | 7 | 1.1 | 1.18 | 73 | A |
| | 16 | 8 | 1.1 | 1.20 | 68 | A |
| Comparative Example 17 | 13 | 5 | 1.7 | 1.20 | 52 | C |
| | 14 | 6 | 1.6 | 1.09 | 70 | B |
| | 15 | 7 | 1.6 | 1.08 | 67 | C |
| | 16 | 8 | 1.4 | 1.10 | 60 | B |
| Comparative Example 18 | 13 | 5 | 11.5 | 1.10 | 29 | D |
| | 14 | 6 | 12.8 | 1.01 | 38 | D |
| | 15 | 7 | 17.1 | 1.00 | 40 | D |
| | 16 | 8 | 14.2 | 1.00 | 38 | D |

Example III

Examples 1 to 6 of Example III relate to the preparation and evaluation of ink jet recording inks using EO adduct or PO adduct (DBPDEP) of 2,2-dibutyl-1,3-propanediol (DBPD).

Example 1

(1) Manufacturing of Dispersions 1 to 4

Dispersions 1 to 4 were prepared in the same manner as Example 1 of Example I except that the final pigment concentration was set to 15%.

(2) Preparation of Ink Jet Recording Ink

Hereinafter, favorable examples of compositions as ink jet recording ink are shown in Table 45. The ink jet recording ink of Example 1 was prepared by mixing the dispersions 1 to 4 prepared by the above method with vehicle components shown in Table 40. 0.05% of Topside 240 (manufactured by Permachem Asia Ltd.) in ion-exchanged water for prevention of corrosion of ink, 0.02% of benzotriazole in ion-exchanged water for prevention of corrosion of ink jet head parts, and 0.04% of EDTA (ethylenediamine tetraacetic acid)·2Na salt in ion-exchanged water for reducing the effects of metal ions in the ink system were used-in the residual quantity of water in Table 40. In the Examples, DBPD-4EO (4EO adduct of 2-dibutyl-1,3-propanediol), DBPD-6EO (6EO adduct of 2-dibutyl-1,3-propanediol), and DBPD-2PO (2PO adduct of 2-dibutyl-1,3-propanediol) were used as examples of DBPDEP. Inks of Comparative Examples 1 to 4 were simultaneously prepared by operating in the same manner as Example 1 except being based on Tables 46 to 49.

(3) Evaluation

The dispersion stability, OD on regular paper, glossiness on glossy paper and discharge stability of the prepared ink jet recording inks were evaluated by operating in the same manner as Example 1 of Example I. The results are shown in Table 44.

TABLE 44

The result of Dispersion stability, Regular paper OD, Glossiness of gloss paper and Discharge stability in Example 1, Comparative Example 1-4

| | Ink | Dispersion | Dispersion stability | Regular paper OD | Glossiness of gloss paper | Discharge stability |
|---|---|---|---|---|---|---|
| Example 1 | 1 | 1 | 1.0 | 1.40 | 71 | A |
| | 2 | 2 | 1.0 | 1.25 | 94 | AA |
| | 3 | 3 | 1.0 | 1.20 | 89 | AA |
| | 4 | 4 | 1.0 | 1.25 | 83 | AA |
| Comparative Example 1 | 5 | 1 | 1.0 | 1.37 | 69 | A |
| | 6 | 2 | 1.0 | 1.14 | 83 | AA |
| | 7 | 3 | 1.0 | 1.19 | 82 | AA |
| | 8 | 4 | 1.0 | 1.20 | 74 | AA |
| Comparative Example 2 | 9 | 1 | 1.0 | 1.36 | 60 | A |
| | 10 | 2 | 1.0 | 1.13 | 81 | A |
| | 11 | 3 | 1.1 | 1.18 | 76 | A |
| | 12 | 4 | 1.1 | 1.20 | 70 | A |
| Comparative Example 3 | 13 | 1 | 1.7 | 1.20 | 55 | C |
| | 14 | 2 | 1.6 | 1.09 | 72 | B |
| | 15 | 3 | 1.6 | 1.08 | 69 | C |
| | 16 | 4 | 1.4 | 1.10 | 63 | B |
| Comparative Example 4 | 17 | 1 | 12.9 | 1.10 | 31 | D |
| | 18 | 2 | 14.8 | 1.01 | 40 | D |
| | 19 | 3 | 16.0 | 1.00 | 42 | D |
| | 20 | 4 | 11.3 | 1.00 | 41 | D |

TABLE 45

Ink compositions of Example 1 (by weight %)

| Pigment | PBk7 | PB15:1 | PV19 | PY74 |
|---|---|---|---|---|
| Dispersion 1 | 40 | — | — | — |
| Dispersion 2 | — | 25 | — | — |
| Dispersion 3 | — | — | 30 | — |
| Dispersion 4 | — | — | — | 30 |
| TEGmBE | 2 | 1 | 1 | 1 |
| 1,2-HD | 3 | 4 | 4 | 4 |
| Glycerin | 10 | 15 | 10 | 10 |
| TMP | 4 | 7 | 5 | 5 |
| DBPD-4EO | 0.6 | 0.6 | 1.4 | 2.0 |
| DBPD-6EO | — | 0.5 | — | — |
| DBPD-2PO | — | — | — | 0.5 |
| S-104 | 0.15 | 0.15 | 0.15 | 0.15 |
| ion-exchanged water | residual amount | residual amount | residual amount | residual amount |

TEGmBE triethylene glycol monobutyl ether
1,2-HD 1,2-hexanediol
TMP trimethylolpropane
DBPDEP EO adduct and/or PO adduct of 2,2-dibutyl-1,3-propanediol
DBPD-4EO 4 EO adduct of 2,2-dibutyl 1,3-propanediol
DBPE-6EO (6 EO adduct of 2,2-dibutyl 1,3-propanediol)
DBPE-2PO (2 PO adduct of 2,2-dibutyl 1,3-propanediol)
S-104 Surfynol104
PBk7 C.I. Pigment Black7
PB15:1 C.I. Pigment Blue15:1
PV19 C.I. Pigment violet19
PY74 C.I. Pigment Yellow74
Surfynol 104 acetylene glycol surfactant manufactured by Nissin Chemical Industry Corporation

TABLE 46

Ink compositions of Comparative Example 1 (by weight %)

| Pigment | PBk7 | PB15:1 | PV19 | PY74 |
|---|---|---|---|---|
| Dispersion 1 | 40 | — | — | — |
| Dispersion 2 | — | 25 | — | — |
| Dispersion 3 | — | — | 30 | — |
| Dispersion 4 | — | — | — | 30 |

TABLE 46-continued

Ink compositions of Comparative Example 1 (by weight %)

| Pigment | PBk7 | PB15:1 | PV19 | PY74 |
|---|---|---|---|---|
| TEGmBE | 2 | 1 | 1 | 1 |
| 1,2-HD | 3 | 4 | 4 | 4 |
| Glycerin | 11 | 16 | 11 | 11 |
| TMP | 4 | 7 | 5 | 5 |
| DBPD-4EO | — | — | — | — |
| DBPD-6EO | — | — | — | — |
| DBPD-2PO | — | — | — | — |
| S-104 | 0.15 | 0.15 | 0.15 | 0.15 |
| ion-exchanged water | residual amount | residual amount | residual amount | residual amount |

TABLE 47

Ink compositions of Comparative Example 2 (by weight %)

| Pigment | PBk7 | PB15:1 | PV19 | PY74 |
|---|---|---|---|---|
| Dispersion 1 | 40 | — | — | — |
| Dispersion 2 | — | 25 | — | — |
| Dispersion 3 | — | — | 30 | — |
| Dispersion 4 | — | — | — | 30 |
| TEGmBE | 2 | 1 | 1 | 1 |
| 1,2-HD | — | — | — | — |
| Glycerin | 14 | 20 | 15 | 15 |
| TMP | 4 | 7 | 5 | 5 |
| DBPD-4EO | — | — | — | — |
| DBPD-6EO | — | — | — | — |
| DBPD-2PO | — | — | — | — |
| S-104 | 0.15 | 0.15 | 0.15 | 0.15 |
| ion-exchanged water | residual amount | residual amount | residual amount | residual amount |

TABLE 48

Ink compositions of Comparative Example 3 (by weight %)

| Pigment | PBk7 | PB15:1 | PV19 | PY74 |
|---|---|---|---|---|
| Dispersion 1 | 40 | — | — | — |
| Dispersion 2 | — | 25 | — | — |
| Dispersion 3 | — | — | 30 | — |
| Dispersion 4 | — | — | — | 30 |
| TEGmBE | 2 | 1 | 1 | 1 |
| 1,2-HD | — | — | — | — |
| Glycerin | 14 | 19 | 15 | 16 |
| TMP | 4 | 7 | 5 | 5 |
| DBPD-4EO | — | — | — | — |
| DBPD-6EO | — | — | — | — |
| DBPD-2PO | — | — | — | — |
| S-104 | — | — | — | — |
| ion-exchanged water | residual amount | residual amount | residual amount | residual amount |

TABLE 49

Ink compositions of Comparative Example 4 (by weight %)

| Pigment | PBk7 | PB15:1 | PV19 | PY74 |
|---|---|---|---|---|
| Dispersion 1 | 40 | — | — | — |
| Dispersion 2 | — | 25 | — | — |
| Dispersion 3 | — | — | 30 | — |
| Dispersion 4 | — | — | — | 30 |
| TEGmBE | — | — | — | — |
| 1,2-HD | — | — | — | — |
| Glycerin | 15 | 20 | 15 | 15 |
| TMP | 4 | 7 | 5 | 5 |
| DBPD-4EO | — | — | — | — |

TABLE 49-continued

Ink compositions of Comparative Example 4 (by weight %)

| Pigment | PBk7 | PB15:1 | PV19 | PY74 |
|---|---|---|---|---|
| DBPD-6EO | — | — | — | — |
| DBPD-2PO | — | — | — | — |
| S-104 | 0.01 | 0.01 | 0.01 | 0.01 |
| ion-exchanged water | residual amount | residual amount | residual amount | residual amount |

Example 2

(1) Manufacturing of Dispersions 5 to 8

Dispersions 5 to 8 were prepared in the same manner as Example 2 of Example I.

(2) Preparation of Ink Jet Recording Ink

Favorable examples of compositions as ink jet recording ink are shown in Table 51. Ink jet recording inks of this Example was prepared in the same manner as Example 1 except being based on the compositions of Table 51. Ink jet recording inks of Comparative Examples 5 to 8 were simultaneously prepared in the same manner as Example 1 except being based on the compositions of Tables 52 to 55.

(3) Evaluation

The dispersion stability, OD on regular paper, glossiness on glossy paper and discharge stability of the prepared ink jet recording inks were evaluated by operating in the same manner as Example 1 of Example I. The results are shown in Table 50.

TABLE 50

The result of Dispersion stability, Regular paper OD, Glossiness of gloss paper and Discharge stability in Example 2, Comparative Example 5-8

| | Ink | Dispersion | Dispersion stability | Regular paper OD | Glossiness of gloss paper | Discharge stability |
|---|---|---|---|---|---|---|
| Example 2 | 9 | 5 | 1.0 | 1.40 | 71 | A |
| | 10 | 6 | 1.0 | 1.25 | 94 | AA |
| | 11 | 7 | 1.0 | 1.20 | 89 | AA |
| | 12 | 8 | 1.0 | 1.25 | 83 | AA |
| Comparative Example 5 | 13 | 5 | 1.0 | 1.37 | 69 | A |
| | 14 | 6 | 1.0 | 1.14 | 83 | AA |
| | 15 | 7 | 1.0 | 1.19 | 82 | AA |
| | 16 | 8 | 1.0 | 1.20 | 74 | AA |
| Comparative Example 6 | 13 | 5 | 1.0 | 1.36 | 60 | A |
| | 14 | 6 | 1.0 | 1.13 | 81 | A |
| | 15 | 7 | 1.1 | 1.18 | 76 | A |
| | 16 | 8 | 1.1 | 1.20 | 70 | A |
| Comparative Example 7 | 13 | 5 | 1.7 | 1.20 | 55 | C |
| | 14 | 6 | 1.6 | 1.09 | 72 | B |
| | 15 | 7 | 1.6 | 1.08 | 69 | C |
| | 16 | 8 | 1.4 | 1.10 | 63 | B |
| Comparative Example 8 | 13 | 5 | 11.5 | 1.10 | 31 | D |
| | 14 | 6 | 12.8 | 1.01 | 40 | D |
| | 15 | 7 | 17.1 | 1.00 | 42 | D |
| | 16 | 8 | 14.2 | 1.00 | 41 | D |

TABLE 51

Ink compositions of Example 2 (by weight %)

| Pigment | PBk7 | PB15:4 | PR122 | PY180 |
|---|---|---|---|---|
| Dispersion 5 | 40 | — | — | — |
| Dispersion 6 | — | 23 | — | — |
| Dispersion 7 | — | — | 34 | — |
| Dispersion 8 | — | — | — | 41 |
| TEGmBE | 2 | 1 | 1 | 1 |
| 1,2-hexanediol | 3 | 4 | 4 | 4 |
| Glycerin | 10 | 15 | 10 | 10 |
| trimethylolpropane | 4 | 7 | 5 | 5 |
| DBPD-4EO | 0.6 | 0.5 | 0.6 | 1.1 |
| DBPD-6EO | — | 0.2 | 0.1 | — |
| DBPD-2PO | — | 0.3 | — | 0.2 |
| Surfynol 104 | 0.15 | 0.15 | 0.15 | 0.15 |
| ion-exchanged water | residual amount | residual amount | residual amount | residual amount |

PB15:4 C.I. Pigment Blue15:4
PR122 C.I. Pigment Red122
PY180 C.I. Pigment Yellow180

TABLE 52

Ink compositions of Comparative Example 5 (by weight %)

| Pigment | PBk7 | PB15:4 | PR122 | PY180 |
|---|---|---|---|---|
| Dispersion 1 | 40 | — | — | — |
| Dispersion 2 | — | 23 | — | — |
| Dispersion 3 | — | — | 31 | — |
| Dispersion 4 | — | — | — | 41 |
| TEGmBE | 2 | 1 | 1 | 1 |
| 1,2-HD | 3 | 4 | 4 | 4 |
| Glycerin | 11 | 16 | 11 | 11 |
| TMP | 4 | 7 | 5 | 5 |
| DBPD-4EO | — | — | — | — |
| DBPD-6EO | — | — | — | — |
| DBPD-2PO | — | — | — | — |
| S-104 | 0.15 | 0.15 | 0.15 | 0.15 |
| ion-exchanged water | residual amount | residual amount | residual amount | residual amount |

TABLE 53

Ink compositions of Comparative Example 6 (by weight %)

| Pigment | PBk7 | PB15:4 | PR122 | PY180 |
|---|---|---|---|---|
| Dispersion 1 | 40 | — | — | — |
| Dispersion 2 | — | 23 | — | — |
| Dispersion 3 | — | — | 31 | — |
| Dispersion 4 | — | — | — | 41 |
| TEGmBE | 2 | 1 | 1 | 1 |
| 1,2-HD | — | — | — | — |
| Glycerin | 14 | 20 | 15 | 15 |
| TMP | 4 | 7 | 5 | 5 |
| DBPD-4EO | — | — | — | — |
| DBPD-6EO | — | — | — | — |
| DBPD-2PO | — | — | — | — |
| S-104 | 0.15 | 0.15 | 0.15 | 0.15 |
| ion-exchanged water | residual amount | residual amount | residual amount | residual amount |

TABLE 54

Ink compositions of Comparative Example 7 (by weight %)

| | Pigment | | | |
|---|---|---|---|---|
| | PBk7 | PB15:4 | PR122 | PY180 |
| Dispersion 1 | 40 | — | — | — |
| Dispersion 2 | — | 23 | — | — |
| Dispersion 3 | — | — | 31 | — |
| Dispersion 4 | — | — | — | 41 |
| TEGmBE | 2 | 1 | 1 | 1 |
| 1,2-HD | — | — | — | — |
| Glycerin | 14 | 19 | 15 | 16 |
| TMP | 4 | 7 | 5 | 5 |
| DBPD-4EO | — | — | — | — |
| DBPD-6EO | — | — | — | — |
| DBPD-2PO | — | — | — | — |
| S-104 | — | — | — | — |
| ion-exchanged water | residual amount | residual amount | residual amount | residual amount |

TABLE 55

Ink compositions of Comparative Example 8 (by weight %)

| | Pigment | | | |
|---|---|---|---|---|
| | PBk7 | PB15:4 | PR122 | PY180 |
| Dispersion 1 | 40 | — | — | — |
| Dispersion 2 | — | 23 | — | — |
| Dispersion 3 | — | — | 31 | — |
| Dispersion 4 | — | — | — | 41 |
| TEGmBE | — | — | — | — |
| 1,2-HD | — | — | — | — |
| Glycerin | 15 | 20 | 15 | 15 |
| TMP | 4 | 7 | 5 | 5 |
| DBPD-4EO | — | — | — | — |
| DBPD-6EO | — | — | — | — |
| DBPD-2PO | — | — | — | — |
| S-104 | 0.01 | 0.01 | 0.01 | 0.01 |
| ion-exchanged water | residual amount | residual amount | residual amount | residual amount |

Examples 3 to 6

(1) Preparation of Ink Jet Recording Ink in which Added Amount of DBPDEP is Changed Examples 3 to 6 of favorable compositions as the ink jet recording ink and Reference Examples 1 and 2 in which the added amount of DBPDEP was changed were prepared in the same manner as Example 1 except being based on Tables 57 to 62.

(2) Evaluation

The dispersion stability, OD on regular paper, glossiness on glossy paper and discharge stability of the prepared ink jet recording inks were evaluated by operating in the same manner as Example 1 of Example I. The results are shown in Table 56.

TABLE 56

The result of Dispersion stability, Regular paper OD, Glossiness of gloss paper and Discharge stability Example 3-6, Reference Example 1 and 2

| | Ink | Dispersion | Dispersion stability | Regular paper OD | Glossiness of gloss paper | Discharge stability |
|---|---|---|---|---|---|---|
| Example 3 | 17 | 1 | 1.0 | 1.38 | 70 | A |
| | 18 | 2 | 1.0 | 1.23 | 92 | AA |
| | 19 | 3 | 1.0 | 1.20 | 85 | AA |
| | 20 | 4 | 1.0 | 1.22 | 80 | AA |
| Example 4 | 21 | 1 | 1.0 | 1.39 | 71 | A |
| | 22 | 2 | 1.0 | 1.23 | 93 | AA |
| | 23 | 3 | 1.0 | 1.21 | 87 | AA |
| | 24 | 4 | 1.0 | 1.23 | 81 | AA |
| Example 5 | 25 | 1 | 1.0 | 1.41 | 72 | A |
| | 26 | 2 | 1.0 | 1.27 | 94 | AA |
| | 27 | 3 | 1.0 | 1.22 | 88 | AA |
| | 28 | 4 | 1.0 | 1.26 | 85 | AA |
| Example 6 | 29 | 1 | 1.0 | 1.40 | 68 | A |
| | 30 | 2 | 1.0 | 1.24 | 90 | AA |
| | 31 | 3 | 1.0 | 1.21 | 83 | AA |
| | 32 | 4 | 1.0 | 1.20 | 79 | AA |
| Reference Example 1 | 33 | 1 | 1.0 | 1.26 | 62 | A |
| | 34 | 2 | 1.0 | 1.10 | 76 | AA |
| | 55 | 3 | 1.0 | 1.10 | 79 | AA |
| | 36 | 4 | 1.0 | 1.15 | 74 | AA |
| Reference Example 2 | 37 | 1 | 2.2 | 1.25 | 51 | C |
| | 38 | 2 | 4.3 | 1.15 | 62 | B |
| | 39 | 3 | 6.0 | 1.10 | 69 | C |
| | 40 | 4 | 2.3 | 1.12 | 63 | C |

TABLE 57

Ink compositions of Example 3 (by weight %)

| | Pigment | | | |
|---|---|---|---|---|
| | PBk7 | PB15:1 | PV19 | PY74 |
| Dispersion 1 | 40 | — | — | — |
| Dispersion 2 | — | 25 | — | — |
| Dispersion 3 | — | — | 30 | — |
| Dispersion 4 | — | — | — | 30 |
| TEGmBE | 2 | 1 | 1 | 1 |
| 1,2-HD | 3 | 4 | 4 | 4 |
| Glycerin | 11 | 16 | 11 | 11 |
| TMP | 4 | 7 | 5 | 5 |
| DBPD-4EO | 0.1 | — | — | 0.1 |
| DBPD-6EO | — | 0.1 | — | — |
| DBPD-2PO | — | — | 0.1 | — |
| S-104 | 0.15 | 0.15 | 0.15 | 0.15 |
| ion-exchanged water | residual amount | residual amount | residual amount | residual amount |

TABLE 58

Ink compositions of Example 4 (by weight %)

| | Pigment | | | |
|---|---|---|---|---|
| | PBk7 | PB15:1 | PV19 | PY74 |
| Dispersion 1 | 40 | — | — | — |
| Dispersion 2 | — | 25 | — | — |
| Dispersion 3 | — | — | 30 | — |
| Dispersion 4 | — | — | — | 30 |
| TEGmBE | 2 | 1 | 1 | 1 |
| 1,2-HD | 3 | 4 | 4 | 4 |
| Glycerin | 10 | 15 | 10 | 10 |
| TMP | 4.5 | 7.5 | 5.5 | 5.5 |
| DBPD-4EO | 0.1 | 0.2 | 0.3 | 0.3 |
| DBPD-6EO | 0.1 | 0.1 | — | — |
| DBPD-2PO | 0.1 | — | 0.15 | — |
| S-104 | 0.15 | 0.15 | 0.15 | 0.15 |
| ion-exchanged water | residual amount | residual amount | residual amount | residual amount |

TABLE 59

Ink compositions of Example 5 (by weight %)

| | Pigment | | | |
|---|---|---|---|---|
| | PBk7 | PB15:1 | PV19 | PY74 |
| Dispersion 1 | 40 | — | — | — |
| Dispersion 2 | — | 25 | — | — |
| Dispersion 3 | — | — | 30 | — |
| Dispersion 4 | — | — | — | 30 |
| TEGmBE | 2 | 1 | 1 | 1 |
| 1,2-HD | 3 | 4 | 4 | 4 |
| Glycerin | 10 | 15 | 10 | 10 |
| TMP | 4 | 7 | 5 | 5 |
| DBPD-4EO | 1.0 | 0.5 | 0.5 | 1.0 |
| DBPD-6EO | — | — | 0.5 | — |
| DBPD-2PO | — | 0.5 | — | — |
| S-104 | 0.15 | 0.15 | 0.15 | 0.15 |
| ion-exchanged water | residual amount | residual amount | residual amount | residual amount |

TABLE 60

Ink compositions of Example 6 (by weight %)

| | Pigment | | | |
|---|---|---|---|---|
| | PBk7 | PB15:1 | PV19 | PY74 |
| Dispersion 1 | 40 | — | — | — |
| Dispersion 2 | — | 25 | — | — |
| Dispersion 3 | — | — | 30 | — |
| Dispersion 4 | — | — | — | 30 |
| TEGmBE | 2 | 1 | 1 | 1 |
| 1,2-HD | 3 | 4 | 4 | 4 |
| Glycerin | 10 | 15 | 10 | 10 |
| TMP | 2 | 5 | 3 | 3 |
| DBPD-4EO | 1.5 | 0.5 | 1.5 | 1.0 |
| DBPD-6EO | — | 0.5 | — | 0.5 |
| DBPD-2PO | — | 0.5 | — | — |
| S-104 | 0.15 | 0.15 | 0.15 | 0.15 |
| ion-exchanged water | residual amount | residual amount | residual amount | residual amount |

TABLE 61

Ink compositions of Reference Example 1 (by weight %)

| | Pigment | | | |
|---|---|---|---|---|
| | PBk7 | PB15:1 | PV19 | PY74 |
| Dispersion 1 | 40 | — | — | — |
| Dispersion 2 | — | 25 | — | — |
| Dispersion 3 | — | — | 30 | — |
| Dispersion 4 | — | — | — | 30 |
| TEGmBE | 2 | 1 | 1 | 1 |
| 1,2-HD | 3 | 4 | 4 | 4 |
| Glycerin | 11 | 16 | 11 | 11 |

TABLE 61-continued

Ink compositions of Reference Example 1 (by weight %)

| | Pigment | | | |
|---|---|---|---|---|
| | PBk7 | PB15:1 | PV19 | PY74 |
| TMP | 4 | 7 | 5 | 5 |
| DBPD-4EO | 0.02 | 0.01 | 0.01 | 0.02 |
| DBPD-6EO | — | 0.01 | — | — |
| DBPD-2PO | — | — | 0.01 | — |
| S-104 | 0.15 | 0.15 | 0.15 | 0.15 |
| ion-exchanged water | residual amount | residual amount | residual amount | residual amount |

TABLE 62

Ink compositions of Reference Example 2 (by weight %)

| | Pigment | | | |
|---|---|---|---|---|
| | PBk7 | PB15:1 | PV19 | PY74 |
| Dispersion 1 | 40 | — | — | — |
| Dispersion 2 | — | 25 | — | — |
| Dispersion 3 | — | — | 30 | — |
| Dispersion 4 | — | — | — | 30 |
| TEGmBE | 2 | 1 | 1 | 1 |
| 1,2-HD | 3 | 4 | 4 | 4 |
| Glycerin | 5 | 10 | 5 | 5 |
| TMP | 1 | 2 | 1 | 1 |
| DBPD-4EO | 6 | 3 | 4 | 6 |
| DBPD-6EO | — | 3 | — | — |
| DBPD-2PO | — | — | 2 | — |
| S-104 | 0.15 | 0.15 | 0.15 | 0.15 |
| ion-exchanged water | residual amount | residual amount | residual amount | residual amount |

Examples 7 to 12

An ink of Example 7, an ink of Example 8 and inks of Examples 9 to 12 were respectively prepared in the same manner as Example 1, Example 2 and Examples 3 to 6. Referring to Comparative Examples, inks of Comparative Examples 9 to 12 (corresponding to Comparative Examples 1 to 4), Comparative Examples 13 to 16 (corresponding to Comparative Examples 5 to 8) and Reference Examples 3 and 4 (corresponding to Reference Examples 1 and 2) were simultaneously prepared with the preparation of ink of each of the Examples. The dispersion stability, OD on regular paper, glossiness on glossy paper and discharge stability of these inks were evaluated by operating in the same manner as Example 1 except the printing number of sheets was set to 100 to 500pages in the evaluation of the discharge stability. The results are shown in Table 63 to 65.

TABLE 63

| | Ink | Dispersion | Dispersion stability | Regular paper OD | Glossiness of gloss paper | Discharge stability |
|---|---|---|---|---|---|---|
| Example 7 | 1 | 1 | 1.0 | 1.40 | 73 | B |
| | 2 | 2 | 1.0 | 1.25 | 99 | A |
| | 3 | 3 | 1.0 | 1.20 | 92 | A |
| | 4 | 4 | 1.0 | 1.25 | 89 | A |
| Comparative Example 9 | 5 | 1 | 1.0 | 1.37 | 75 | B |
| | 6 | 2 | 1.0 | 1.14 | 85 | A |
| | 7 | 3 | 1.0 | 1.19 | 84 | A |
| | 8 | 4 | 1.0 | 1.20 | 76 | A |

TABLE 63-continued

| | Ink | Dispersion | Dispersion stability | Regular paper OD | Glossiness of gloss paper | Discharge stability |
|---|---|---|---|---|---|---|
| Comparative Example 10 | 9 | 1 | 1.0 | 1.36 | 62 | B |
| | 10 | 2 | 1.0 | 1.13 | 83 | B |
| | 11 | 3 | 1.1 | 1.18 | 79 | B |
| | 12 | 4 | 1.1 | 1.20 | 73 | B |
| Comparative Example 11 | 13 | 1 | 1.7 | 1.20 | 60 | D |
| | 14 | 2 | 1.6 | 1.09 | 74 | C |
| | 15 | 3 | 1.6 | 1.08 | 73 | D |
| | 16 | 4 | 1.4 | 1.10 | 66 | C |
| Comparative Example 12 | 17 | 1 | 12.9 | 1.10 | 35 | D |
| | 18 | 2 | 14.8 | 1.01 | 44 | D |
| | 19 | 3 | 16.0 | 1.00 | 45 | D |
| | 20 | 4 | 11.3 | 1.00 | 43 | D |

TABLE 64

| | Ink | Dispersion | Dispersion stability | Regular paper OD | Glossiness of gloss paper | Discharge stability |
|---|---|---|---|---|---|---|
| Example 8 | 9 | 5 | 1.0 | 1.40 | 74 | B |
| | 10 | 6 | 1.0 | 1.25 | 99 | A |
| | 11 | 7 | 1.0 | 1.20 | 92 | A |
| | 12 | 8 | 1.0 | 1.25 | 87 | A |
| Comparative Example 13 | 13 | 5 | 1.0 | 1.37 | 74 | B |
| | 14 | 6 | 1.0 | 1.14 | 88 | A |
| | 15 | 7 | 1.0 | 1.19 | 87 | A |
| | 16 | 8 | 1.0 | 1.20 | 79 | A |
| Comparative Example 14 | 13 | 5 | 1.0 | 1.36 | 65 | B |
| | 14 | 6 | 1.0 | 1.13 | 84 | B |
| | 15 | 7 | 1.1 | 1.18 | 81 | B |
| | 16 | 8 | 1.1 | 1.20 | 76 | B |
| Comparative Example 15 | 13 | 5 | 1.7 | 1.20 | 59 | D |
| | 14 | 6 | 1.6 | 1.09 | 76 | C |
| | 15 | 7 | 1.6 | 1.08 | 72 | D |
| | 16 | 8 | 1.4 | 1.10 | 69 | C |
| Comparative Example 16 | 13 | 5 | 11.5 | 1.10 | 34 | D |
| | 14 | 6 | 12.8 | 1.01 | 42 | D |
| | 15 | 7 | 17.1 | 1.00 | 46 | D |
| | 16 | 8 | 14.2 | 1.00 | 45 | D |

TABLE 65

| | Ink | Dispersion | Dispersion stability | Regular paper OD | Glossiness of gloss paper | Discharge stability |
|---|---|---|---|---|---|---|
| Example 9 | 17 | 1 | 1.0 | 1.38 | 75 | B |
| | 18 | 2 | 1.0 | 1.23 | 98 | A |
| | 19 | 3 | 1.0 | 1.20 | 89 | A |
| | 20 | 4 | 1.0 | 1.22 | 84 | A |
| Example 10 | 21 | 1 | 1.0 | 1.39 | 76 | B |
| | 22 | 2 | 1.0 | 1.23 | 95 | A |
| | 23 | 3 | 1.0 | 1.21 | 91 | A |
| | 24 | 4 | 1.0 | 1.23 | 87 | A |
| Example 11 | 25 | 1 | 1.0 | 1.41 | 79 | B |
| | 26 | 2 | 1.0 | 1.27 | 100 | A |
| | 27 | 3 | 1.0 | 1.22 | 94 | A |
| | 28 | 4 | 1.0 | 1.26 | 90 | A |
| Example 12 | 29 | 1 | 1.0 | 1.40 | 72 | B |
| | 30 | 2 | 1.0 | 1.24 | 93 | A |
| | 31 | 3 | 1.0 | 1.21 | 86 | A |
| | 32 | 4 | 1.0 | 1.20 | 82 | A |
| Reference Example 3 | 33 | 1 | 1.0 | 1.26 | 65 | B |
| | 34 | 2 | 1.0 | 1.10 | 87 | A |
| | 55 | 3 | 1.0 | 1.10 | 84 | A |
| | 36 | 4 | 1.0 | 1.15 | 77 | A |
| Reference Example 4 | 37 | 1 | 2.2 | 1.25 | 54 | D |
| | 38 | 2 | 4.3 | 1.15 | 65 | C |
| | 39 | 3 | 6.0 | 1.10 | 71 | D |
| | 40 | 4 | 2.3 | 1.12 | 68 | D |

Example IV

Examples 1 to 6 of Example IV relate to the preparation and evaluation of ink jet recording inks using 2-butyl-2-methyl-1,2-propanediol (BMPD).

Example 1

(1) Manufacturing of Dispersions 1 to 4

Dispersions 1 to 4 were prepared in the same manner as Example 1 of Example I except that final pigment concentration was set to 15%.

(2) Preparation of Ink Jet Recording Ink

Hereinafter, favorable examples of compositions as ink jet recording ink are shown in Table 67. Ink jet recording inks of Example 1 were prepared by mixing the dispersions 1 to 4 prepared by the above method with vehicle components shown in Table 40. 0.05% of Topside 240 (manufactured by Permachem Asia Ltd.) in ion-exchanged water for prevention of corrosion of ink, 0.02% of benzotriazole in ion-exchanged water for prevention of corrosion of ink jet head parts, and 0.04% of EDTA (ethylenediamine tetraacetic acid)·2Na salt in ion-exchanged water for reducing the effects of metal ions in the ink system were used in the residual quantity of water in Table 40. Inks of Comparative Examples 1 and 2 were simultaneously prepared in the same manner as Example 1 except being based on Tables 68 and 69.

(3) Evaluation

The dispersion stability, OD on regular paper and glossiness on glossy paper of the prepared ink jet recording inks were evaluated by operating in the same manner as Example 1 of Example I. The results are shown in Table 66. The clogging stability was evaluated. Referring to the measurement of the clogging stability, the number of times of cleaning (a mechanism with which PX-V600 is equipped as a means for recovering missing dots) required for printing after leaving for 1 year in an atmosphere at a temperature of 35° C. and humidity of 35% which is an environment of high temperature and low humidity was measured by using PX-V600 manufactured by Seiko Epson Co., Ltd., as the ink-jet printer. The results are shown in Table 66.

TABLE 66

The result of Dispersion stability, Regular paper OD, Glossiness of gloss paper and Discharge stability in Example 1, Comparative Example 1 and 2

| | Ink | Dispersion | Dispersion stability | Regular paper OD | Glossiness of gloss paper | Discharge stability |
|---|---|---|---|---|---|---|
| Example 1 | 1 | 1 | 1.0 | 1.40 | 71 | A |
| | 2 | 2 | 1.0 | 1.25 | 94 | AA |
| | 3 | 3 | 1.0 | 1.20 | 89 | AA |
| | 4 | 4 | 1.0 | 1.25 | 83 | AA |
| Comparative Example 1 | 5 | 1 | 1.0 | 1.37 | 69 | A |
| | 6 | 2 | 1.0 | 1.14 | 83 | AA |
| | 7 | 3 | 1.0 | 1.19 | 82 | AA |
| | 8 | 4 | 1.0 | 1.20 | 74 | AA |
| Comparative Example 2 | 9 | 1 | 1.0 | 1.36 | 60 | A |
| | 10 | 2 | 1.0 | 1.13 | 81 | A |
| | 11 | 3 | 1.1 | 1.18 | 76 | A |
| | 12 | 4 | 1.1 | 1.20 | 70 | A |

TABLE 67

Ink compositions of Example 1 (by weight %)

| | Pigment | | | |
|---|---|---|---|---|
| | PBk7 | PB15:1 | PV19 | PY74 |
| Dispersion 1 | 40 | — | — | — |
| Dispersion 2 | — | 25 | — | — |
| Dispersion 3 | — | — | 30 | — |
| Dispersion 4 | — | — | — | 30 |
| TEGmBE | 2 | 1 | 1 | 1 |
| 1,2-HD | 3 | 4 | 4 | 4 |
| Glycerin | 10 | 15 | 10 | 10 |
| TMP | 4 | 7 | 5 | 5 |
| BMPD | 0.6 | 1.1 | 1.4 | 1.5 |
| S-104 | 0.15 | 0.15 | 0.15 | 0.15 |
| ion-exchanged water | residual amount | residual amount | residual amount | residual amount |

TEGmBE triethylene glycol monobutyl ether
1,2-HD 1,2-hexanediol
TMP trimethylolpropane
BMPD 2-butyl-2-methyl-1,3-propanediol
S-104 Surfynol104
PBk7 C.I. Pigment Black 7
PB15:1 C.I. Pigment Blue15:1
PV19 C.I. Pigment Violet19
PY74 C.I. Pigment Yellow74
Surfynol 104 acetylene glycol surfactant manufactured by Nissin Chemical Industry Corporation

TABLE 68

Ink compositions of Comparative Example 1 (by weight %)

| | Pigment | | | |
|---|---|---|---|---|
| | PBk7 | PB15:1 | PV19 | PY74 |
| Dispersion 1 | 40 | — | — | — |
| Dispersion 2 | — | 25 | — | — |
| Dispersion 3 | — | — | 30 | — |
| Dispersion 4 | — | — | — | 30 |
| TEGmBE | — | — | — | — |
| 1,2-HD | 3 | 4 | 4 | 4 |
| Glycerin | 11 | 16 | 11 | 11 |
| TMP | 4 | 7 | 5 | 5 |
| BMPD | — | — | — | — |
| S-104 | 0.15 | 0.15 | 0.15 | 0.15 |
| ion-exchanged water | residual amount | residual amount | residual amount | residual amount |

TABLE 69

Ink compositions of Comparative Example 2 (by weight %)

| | Pigment | | | |
|---|---|---|---|---|
| | PBk7 | PB15:1 | PV19 | PY74 |
| Dispersion 1 | 40 | — | — | — |
| Dispersion 2 | — | 25 | — | — |
| Dispersion 3 | — | — | 30 | — |
| Dispersion 4 | — | — | — | 30 |
| TEGmBE | 2 | 1 | 1 | 1 |
| 1,2-HD | — | — | — | — |
| Glycerin | 12 | 17 | 15 | 14 |
| TMP | 4 | 7 | 5 | 5 |
| BMPD | — | — | — | — |
| S-104 | 0.15 | 0.15 | 0.15 | 0.15 |
| ion-exchanged water | residual amount | residual amount | residual amount | residual amount |

Example 2

(1) Manufacturing of Dispersions 5 to 8

Dispersions 5 to 8 were prepared in the same manner as Example 2 of Example I.

(2) Preparation of Ink Jet Recording Ink

Favorable examples of compositions as ink jet recording ink are shown in Table 71. An ink jet recording ink of this Example was prepared in the same manner as Example 1 except being based on Table 71. Ink jet recording inks of Reference Examples 1 and 2 and Comparative Examples 3 and 4 were simultaneously prepared by operating in the same manner as Example 1 except being based on the compositions Tables 72 to 75.

(3) Evaluation

The dispersion stability, OD on regular paper and glossiness on glossy paper of the prepared ink jet recording inks were evaluated by operating in the same manner as Example 1 of Example I. The clogging stability was evaluated by operating in the same manner as Example 1. The results are shown in Table 70.

TABLE 70

The result of Dispersion stability, Regular paper OD, Glossiness of gloss paper and Discharge stability in Example 2, Reference Example 1 and 2, Comparative Example 3 and 4

|  | Ink | Dispersion | Dispersion stability | Regular paper OD | Glossiness of gloss paper | Discharge stability |
|---|---|---|---|---|---|---|
| Example 2 | 9 | 5 | 1.0 | 1.40 | 71 | A |
|  | 10 | 6 | 1.0 | 1.25 | 94 | AA |
|  | 11 | 7 | 1.0 | 1.20 | 89 | AA |
|  | 12 | 8 | 1.0 | 1.25 | 83 | AA |
| Reference Example 1 | 13 | 5 | 1.0 | 1.37 | 69 | A |
|  | 14 | 6 | 1.0 | 1.14 | 83 | AA |
|  | 15 | 7 | 1.0 | 1.19 | 82 | AA |
|  | 16 | 8 | 1.0 | 1.20 | 74 | AA |
| Comparative Example 3 | 13 | 5 | 1.0 | 1.36 | 60 | A |
|  | 14 | 6 | 1.0 | 1.13 | 81 | A |
|  | 15 | 7 | 1.1 | 1.18 | 76 | A |
|  | 16 | 8 | 1.1 | 1.20 | 70 | A |
| Reference Example 2 | 13 | 5 | 1.7 | 1.20 | 55 | C |
|  | 14 | 6 | 1.6 | 1.09 | 72 | B |
|  | 15 | 7 | 1.6 | 1.08 | 69 | C |
|  | 16 | 8 | 1.4 | 1.10 | 63 | B |
| Comparative Example 4 | 13 | 5 | 11.5 | 1.10 | 31 | D |
|  | 14 | 6 | 12.8 | 1.01 | 40 | D |
|  | 15 | 7 | 17.1 | 1.00 | 42 | D |
|  | 16 | 8 | 14.2 | 1.00 | 41 | D |

TABLE 71

Ink compositions of Example 2 (by weight %)

|  | Pigment | | | |
|---|---|---|---|---|
|  | PBk7 | PB15:4 | PR122 | PY180 |
| Dispersion 5 | 40 | — | — | — |
| Dispersion 6 | — | 23 | — | — |
| Dispersion 7 | — | — | 34 | — |
| Dispersion 8 | — | — | — | 41 |
| TEGmBE | 2 | 1 | 1 | 1 |
| 1,2-hexanediol | 3 | 4 | 4 | 4 |
| Glycerin | 10 | 15 | 10 | 10 |
| trimethylolpropane | 4 | 7 | 5 | 5 |
| BMPD | 0.6 | 0.5 | 0.6 | 0.5 |
| Surfynol 104 | 0.15 | 0.15 | 0.15 | 0.15 |
| ion-exchanged water | residual amount | residual amount | residual amount | residual amount |

PB15:4 C.I. Pigment Blue 15:4
PR122 C.I. Pigment Red 122
PY180 C.I. Pigment Yellow 180

TABLE 72

Ink compositions of Reference Example 1 (by weight %)

|  | Pigment | | | |
|---|---|---|---|---|
|  | PBk7 | PB15:4 | PR122 | PY180 |
| Dispersion 1 | 40 | — | — | — |
| Dispersion 2 | — | 23 | — | — |
| Dispersion 3 | — | — | 34 | — |
| Dispersion 4 | — | — | — | 41 |
| TEGmBE | 2 | 1 | 1 | 1 |
| 1,2-HD | 3 | 4 | 4 | 4 |
| Glycerin | 10 | 15 | 10 | 10 |
| TMP | 4 | 7 | 5 | 5 |
| PMPD | 0.6 | 0.5 | 0.6 | 0.5 |
| S-104 | 0.15 | 0.15 | 0.15 | 0.15 |
| ion-exchanged water | residual amount | residual amount | residual amount | residual amount |

PMPD: 2-propyl-2-methyl-1,3-propanediol

TABLE 73

Ink compositions of Comparative Example 3 (by weight %)

|  | Pigment | | | |
|---|---|---|---|---|
|  | PBk7 | PB15:4 | PR122 | PY180 |
| Dispersion 1 | 40 | — | — | — |
| Dispersion 2 | — | 23 | — | — |
| Dispersion 3 | — | — | 34 | — |
| Dispersion 4 | — | — | — | 41 |
| TEGmBE | 2 | 1 | 1 | 1 |
| 1,2-HD | 3 | 4 | 4 | 4 |
| Glycerin | 10 | 15 | 10 | 10 |
| TMP | 4 | 7 | 5 | 5 |
| BEPD | 0.6 | 0.5 | 0.6 | 0.5 |
| S-104 | 0.15 | 0.15 | 0.15 | 0.15 |
| ion-exchanged water | residual amount | residual amount | residual amount | residual amount |

BEPD: 2-butyl-2-ethyl-1,3-propanediol

TABLE 74

Ink compositions of Reference Example 2 (by weight %)

|  | Pigment | | | |
|---|---|---|---|---|
|  | PBk7 | PB15:4 | PR122 | PY180 |
| Dispersion 1 | 40 | — | — | — |
| Dispersion 2 | — | 23 | — | — |
| Dispersion 3 | — | — | 34 | — |
| Dispersion 4 | — | — | — | 41 |
| TEGmBE | 2 | 1 | 1 | 1 |
| 1,2-HD | 3 | 4 | 4 | 4 |
| Glycerin | 10 | 15 | 10 | 10 |

TABLE 74-continued

Ink compositions of Reference Example 2 (by weight %)

| | Pigment | | | |
|---|---|---|---|---|
| | PBk7 | PB15:4 | PR122 | PY180 |
| TMP | 4 | 7 | 5 | 5 |
| DBPD | 0.6 | 0.5 | 0.6 | 0.5 |
| S-104 | 0.15 | 0.15 | 0.15 | 0.15 |
| ion-exchanged water | residual amount | residual amount | residual amount | residual amount |

DBPD: 2,2-dibutyl-1,3-propanediol

TABLE 75

Ink compositions of Comparative Example 4 (by weight %)

| | Pigment | | | |
|---|---|---|---|---|
| | PBk7 | PB15:4 | PR122 | PY180 |
| Dispersion 1 | 40 | — | — | — |
| Dispersion 2 | — | 23 | — | — |
| Dispersion 3 | — | — | 34 | — |
| Dispersion 4 | — | — | — | 41 |
| TEGmBE | 2 | 1 | 1 | 1 |
| 1,2-HD | 3 | 4 | 4 | 4 |
| Glycerin | 10 | 15 | 10 | 10 |
| TMP | 4 | 7 | 5 | 5 |
| DEPD | 0.6 | 0.5 | 0.6 | 0.5 |
| S-104 | 0.15 | 0.15 | 0.15 | 0.15 |
| ion-exchanged water | residual amount | residual amount | residual amount | residual amount |

DEPD: 2,2-diethyl-1,3-propanediol

Examples 3 to 6

(1) Preparation of Ink Jet Recording Ink in which Added Amount of BMPD is Changed Examples 3 to 6 of favorable compositions as the ink jet recording ink and Reference Examples 3 and 4 in which the added amount of BMPD was changed were prepared by operating in the same manner as Example 1 except being based on Tables 77 to 82.

(2) Evaluation

The dispersion stability, OD on regular paper and glossiness on glossy paper of the prepared ink jet recording inks were evaluated by operating in the same manner as Example 1 of Example I. The clogging stability was evaluated by operating in the same manner as Example 1. The results are shown in Table 76.

TABLE 76

The result of Dispersion stability, Regular paper OD, Glossiness of gloss paper and Discharge stability in Example 3-6, Reference Example 3 and 4

| | Ink | Dispersion | Dispersion stability | Regular paper OD | Glossiness of gloss paper | Discharge stability |
|---|---|---|---|---|---|---|
| Example 3 | 17 | 1 | 1.0 | 1.38 | 70 | A |
| | 18 | 2 | 1.0 | 1.23 | 92 | AA |
| | 19 | 3 | 1.0 | 1.20 | 85 | AA |
| | 20 | 4 | 1.0 | 1.22 | 80 | AA |
| Example 4 | 21 | 1 | 1.0 | 1.39 | 71 | A |
| | 22 | 2 | 1.0 | 1.23 | 93 | AA |

TABLE 76-continued

The result of Dispersion stability, Regular paper OD, Glossiness of gloss paper and Discharge stability in Example 3-6, Reference Example 3 and 4

| | Ink | Dispersion | Dispersion stability | Regular paper OD | Glossiness of gloss paper | Discharge stability |
|---|---|---|---|---|---|---|
| | 23 | 3 | 1.0 | 1.21 | 87 | AA |
| | 24 | 4 | 1.0 | 1.23 | 81 | AA |
| Example 5 | 25 | 1 | 1.0 | 1.41 | 72 | A |
| | 26 | 2 | 1.0 | 1.27 | 94 | AA |
| | 27 | 3 | 1.0 | 1.22 | 88 | AA |
| | 28 | 4 | 1.0 | 1.26 | 85 | AA |
| Example 6 | 29 | 1 | 1.0 | 1.40 | 68 | A |
| | 30 | 2 | 1.0 | 1.24 | 90 | AA |
| | 31 | 3 | 1.0 | 1.21 | 83 | AA |
| | 32 | 4 | 1.0 | 1.20 | 79 | AA |
| Reference Example 3 | 33 | 1 | 1.0 | 1.26 | 62 | A |
| | 34 | 2 | 1.0 | 1.10 | 76 | AA |
| | 55 | 3 | 1.0 | 1.10 | 79 | AA |
| | 36 | 4 | 1.0 | 1.15 | 74 | AA |
| Reference Example 4 | 37 | 1 | 2.2 | 1.25 | 51 | C |
| | 38 | 2 | 4.3 | 1.15 | 62 | B |
| | 39 | 3 | 6.0 | 1.10 | 69 | C |
| | 40 | 4 | 2.3 | 1.12 | 63 | C |

TABLE 77

Ink compositions of Example 3 (by weight %)

| | Pigment | | | |
|---|---|---|---|---|
| | PBk7 | PB15:1 | PV19 | PY74 |
| Dispersion 1 | 40 | — | — | — |
| Dispersion 2 | — | 25 | — | — |
| Dispersion 3 | — | — | 30 | — |
| Dispersion 4 | — | — | — | 30 |
| TEGmBE | 2 | 1 | 1 | 1 |
| 1,2-HD | 3 | 4 | 4 | 4 |
| Glycerin | 11 | 16 | 11 | 11 |
| TMP | 4 | 7 | 5 | 5 |
| BMPD | 0.1 | 0.1 | 0.1 | 0.1 |
| S-104 | 0.15 | 0.15 | 0.15 | 0.15 |
| ion-exchanged water | residual amount | residual amount | residual amount | residual amount |

TABLE 78

Ink compositions of Example 4 (by weight %)

| | Pigment | | | |
|---|---|---|---|---|
| | PBk7 | PB15:1 | PV19 | PY74 |
| Dispersion 1 | 40 | — | — | — |
| Dispersion 2 | — | 25 | — | — |
| Dispersion 3 | — | — | 30 | — |
| Dispersion 4 | — | — | — | 30 |
| TEGmBE | 2 | 1 | 1 | 1 |
| 1,2-HD | 3 | 4 | 4 | 4 |
| Glycerin | 10 | 15 | 10 | 10 |
| TMP | 4.5 | 7.5 | 5.5 | 5.5 |
| BMPD | 0.1 | 0.2 | 0.3 | 0.3 |
| S-104 | 0.15 | 0.15 | 0.15 | 0.15 |
| ion-exchanged water | residual amount | residual amount | residual amount | residual amount |

TABLE 79

Ink compositions of Example 5 (by weight %)

| | Pigment | | | |
|---|---|---|---|---|
| | PBk7 | PB15:1 | PV19 | PY74 |
| Dispersion 1 | 40 | — | — | — |
| Dispersion 2 | — | 25 | — | — |
| Dispersion 3 | — | — | 30 | — |
| Dispersion 4 | — | — | — | 30 |
| TEGmBE | 2 | 1 | 1 | 1 |
| 1,2-HD | 3 | 4 | 4 | 4 |
| Glycerin | 10 | 15 | 10 | 10 |
| TMP | 4 | 7 | 5 | 5 |
| BMPD | 1.0 | 0.5 | 0.5 | 1.0 |
| S-104 | 0.15 | 0.15 | 0.15 | 0.15 |
| ion-exchanged water | residual amount | residual amount | residual amount | residual amount |

TABLE 80

Ink compositions of Example 6 (by weight %)

| | Pigment | | | |
|---|---|---|---|---|
| | PBk7 | PB15:1 | PV19 | PY74 |
| Dispersion 1 | 40 | — | — | — |
| Dispersion 2 | — | 25 | — | — |
| Dispersion 3 | — | — | 30 | — |
| Dispersion 4 | — | — | — | 30 |
| TEGmBE | 2 | 1 | 1 | 1 |
| 1,2-HD | 3 | 4 | 4 | 4 |
| Glycerin | 10 | 15 | 10 | 10 |
| TMP | 2 | 5 | 3 | 3 |
| BMPD | 1.5 | 0.5 | 1.5 | 1.0 |
| S-104 | 0.15 | 0.15 | 0.15 | 0.15 |
| ion-exchanged water | residual amount | residual amount | residual amount | residual amount |

TABLE 81

Ink compositions of Reference Example 3 (by weight %)

| Pigment | PBk7 | PB15:1 | PV19 | PY74 |
|---|---|---|---|---|
| Dispersion 1 | 40 | — | — | — |
| Dispersion 2 | — | 25 | — | — |
| Dispersion 3 | — | — | 30 | — |
| Dispersion 4 | — | — | — | 30 |
| TEGmBE | 2 | 1 | 1 | 1 |
| 1,2-HD | 3 | 4 | 4 | 4 |
| Glycerin | 11 | 16 | 11 | 11 |
| TMP | 4 | 7 | 5 | 5 |
| BMPD | 0.02 | 0.01 | 0.01 | 0.02 |
| S-104 | 0.15 | 0.15 | 0.15 | 0.15 |
| ion-exchanged water | residual amount | residual amount | residual amount | residual amount |

TABLE 82

Ink compositions of Reference Example 4 (by weight %)

| Pigment | PBk7 | PB15:1 | PV19 | PY74 |
|---|---|---|---|---|
| Dispersion 1 | 40 | — | — | — |
| Dispersion 2 | — | 25 | — | — |
| Dispersion 3 | — | — | 30 | — |
| Dispersion 4 | — | — | — | 30 |
| TEGmBE | 2 | 1 | 1 | 1 |
| 1,2-HD | 3 | 4 | 4 | 4 |
| Glycerin | 5 | 10 | 5 | 5 |

TABLE 82-continued

Ink compositions of Reference Example 4 (by weight %)

| Pigment | PBk7 | PB15:1 | PV19 | PY74 |
|---|---|---|---|---|
| TMP | 1 | 2 | 1 | 1 |
| BMPD | 6 | 6 | 6 | 6 |
| S-104 | 0.15 | 0.15 | 0.15 | 0.15 |
| ion-exchanged water | residual amount | residual amount | residual amount | residual amount |

Contents of Japan patent application Nos. 2005-43549, 2005-194650, 2006-57318 and 2006-84948 are incorporated herein by reference in their entirety.

What is claimed is:

1. An ink for ink-jet recording containing a 1,3-propanediol derivative being one or more selected from the group consisting of:
    (a) 2-methyl-2-propyl-1,3-propanediol in an amount of 0.1 to 2.0% by weight;
    (b) 2,2-dibutyl-1,3-propanediol in an amount of 0.1 to 1.5% by weight;
    (c) 2-butyl-2-methyl-1,3-propanediol in an amount of 0.1 to 5.0% by weight; and
    (d) one or more adducts selected from the group consisting of an ethylene oxide adduct of 2,2-dibutyl-1,3-propanediol
    and a propylene oxide adduct of 2,2-dibutyl-1,3-propanediol,
    said one or more adducts being present in the ink in an amount of 0.1 to 5.0% by weight.

2. The ink for inkjet ink according to claim 1, wherein the ethylene oxide adduct contains ethylene oxide in an amount of no less than 1 and no more than 10 per molecule of 2,2-dibutyl-1,3-propanediol, and the propylene oxide adduct contains propylene oxide in an amount of no less than 1 and no more than 5 per molecule of 2,2-dibutyl-1,3-propanediol.

3. The ink for ink-jet recording according to claim 1, further containing 1,2-alkylene glycol.

4. The ink for ink-jet recording according to claim 1, further containing an acetylene glycol surfactant and/or an acetylene alcohol surfactant.

5. The ink for ink-jet recording according to claim 1, containing at least water, a coloring material, and humectant.

6. The ink for ink-jet recording according to claim 1, containing a pigment as a coloring material and a polymer for dispersion of the pigment, wherein a glass transition temperature of the polymer for the dispersion of the pigment is 50° C. or less.

7. An ink composition comprising water, a coloring material, a humectant and a 1,3-propanediol derivative, said 1,3-propanediol derivative being present in the ink composition in an amount effective to improve coloration and glossiness of the ink composition, as compared with the ink composition without the 1,3-propanediol derivative, without adversely affecting a discharge stability of the ink composition, said 1,3-propanediol derivative being selected from the group consisting of (a) 2-methyl-2-propyl-1,3-propanediol in an amount of 0.1 to 2.0% by weight;

(b) 2,2-dibutyl-1,3-propanediol in an amount of 0.1 to 1.5% by weight;

(c) 2-butyl-2-methyl-1,3-propanediol in an amount of 0.1 to 5.0% by weight; and (d) one or more adducts selected from the group consisting of an ethylene oxide adduct of 2,2-dibutyl-1,3-propanediol and a propylene oxide adduct of 2,2-dibutyl-1,3-propanediol, said one or more adducts being present in the ink in an amount of 0.1 to 5.0% by weight.

8. The ink composition according to claim 7, containing a pigment as the coloring material and a polymer for dispersion of the pigment, wherein the polymer has a glass transition temperature of 50° C. or less.

* * * * *

UNITED STATES PATENT AND TRADEMARK OFFICE
CERTIFICATE OF CORRECTION

PATENT NO. : 7,569,104 B2
APPLICATION NO. : 11/435564
DATED : August 4, 2009
INVENTOR(S) : Masahiro Yatake It is certified that error appears in the above-identified patent and that said Letters Patent is hereby corrected as shown below:

Item (73), assignee's name: "Eiko" should read --Seiko--.

Signed and Sealed this

Eighth Day of June, 2010

David J. Kappos
*Director of the United States Patent and Trademark Office*